United States Patent
Numata et al.

(10) Patent No.: US 6,631,106 B1
(45) Date of Patent: Oct. 7, 2003

(54) SPARE AREA WITH A PREDETERMINED CAPACITY FOR A DETECTIVE SECTOR ALLOCATED IN EACH ZONE

(75) Inventors: Takehiko Numata, Kawasaki (JP); Mineo Moribe, Kawasaki (JP); Atsushi Takeuchi, Miyagi (JP); Teruo Chiba, Miyagi (JP)

(73) Assignees: Fujitsu Limited, Kawasaki (JP); Sony Corporation, Tokyo (JP)

( * ) Notice: Subject to any disclaimer, the term of this patent is extended or adjusted under 35 U.S.C. 154(b) by 0 days.

(21) Appl. No.: 09/246,638

(22) Filed: Feb. 8, 1999

(30) Foreign Application Priority Data

Jul. 21, 1998 (JP) ............................... 10-205031

(51) Int. Cl.[7] .................................. G11B 7/00
(52) U.S. Cl. ................. 369/53.17; 369/44.33; 369/53.15; 369/30.07; 369/47.14
(58) Field of Search .................. 369/30.07, 47.14, 369/53.41, 53.17, 53.24, 53.25, 53.13, 53.29, 13.44, 13.46, 53.15, 44.33, 275.3, 275.1, 30.13; 360/53, 72.2, 77.02; 711/201, 1, 4

(56) References Cited

U.S. PATENT DOCUMENTS

| | | | | |
|---|---|---|---|---|
| 5,111,444 A | * | 5/1992 | Fukushima et al. | 369/53.17 |
| 5,138,599 A | * | 8/1992 | Fukushima et al. | 369/30.13 |
| 5,235,585 A | * | 8/1993 | Bish et al. | 369/53.17 |
| 5,241,531 A | * | 8/1993 | Ohno et al. | 369/59.25 |
| 5,271,018 A | | 12/1993 | Chan | 371/10.2 |
| 5,319,627 A | * | 6/1994 | Shinno et al. | 369/53.17 |
| 5,345,435 A | * | 9/1994 | Yamasaki | 369/275.3 |
| 5,715,221 A | * | 2/1998 | Ito et al. | 369/47.14 |
| 5,717,662 A | * | 2/1998 | Nishimura | 369/13.44 |
| 5,848,438 A | * | 12/1998 | Nemzzie et al. | 711/201 |
| 6,175,549 B1 | * | 1/2001 | Takagi et al. | 369/53.15 |

FOREIGN PATENT DOCUMENTS

| | | |
|---|---|---|
| GB | 2326015 | 12/1998 |
| JP | 54146617 | 11/1979 |
| JP | 62259267 | 11/1987 |
| JP | 6358671 | 3/1988 |
| JP | 63282967 | 11/1988 |
| JP | 02-156477 | 6/1990 |
| JP | 04-006670 | 1/1992 |
| JP | 453071 | 2/1992 |
| JP | 05-114247 | 5/1993 |
| JP | 7235139 | 9/1995 |
| JP | 8123626 | 5/1996 |
| JP | 08-124304 | 5/1996 |
| JP | 09-063137 | 3/1997 |
| JP | 9251721 | 9/1997 |

* cited by examiner

*Primary Examiner*—William Korzuch
*Assistant Examiner*—Kim-Kwok Chu
(74) *Attorney, Agent, or Firm*—Greer, Burns & Crain, Ltd.

(57) ABSTRACT

In a rewritable optical recording medium, a recording surface is divided into a plurality of zones by setting pitch intervals in the radial direction to be constant and a data area and a spare area for a defective sector are allocated in each zone. As for a capacity of the spare area in each zone, a predetermined total capacity of spare areas is allocated so that a spare ratio K=D1/D2 of a capacity D2 of the spare areas for a capacity D1 of the data areas becomes almost the same in the zones.

20 Claims, 20 Drawing Sheets

F I G. 5

| AREA NAME | START POSITION | | END POSITION | |
|---|---|---|---|---|
| | TRACK NO. | SECTOR NO. | TRACK NO. | SECTOR NO. |
| FIRST DEFECT MANAGEMENT AREA (DMA1) | 0 | 0 | 0 | 10 |
| RESERVE | 0 | 11 | 1 | 16 |
| SECOND DEFECT MANAGEMENT AREA (DMA2) | 2 | 0 | 2 | 10 |
| THIRD DEFECT MANAGEMENT AREA (DMA3) | 36839 | 0 | 36839 | 10 |
| RESERVE | 36839 | 11 | 36840 | 16 |
| FOURTH DEFECT MANAGEMENT AREA (DMA4) | 36840 | 0 | 36841 | 10 |

FIG. 7

72 DISK MAP DATA (DMD)

| | ZONE NO. | THE NUMBER OF DATA SECTORS | THE NUMBER OF SPACE SECTORS | THE NUMBER OF SPARE LOGICAL TRACKS |
|---|---|---|---|---|
| OUTER | 0 | 43911 | 153 | 9 |
| | 1 | 42840 | 153 | 9 |
| | 2 | 41769 | 153 | 9 |
| | 3 | 40690 | 153 | 9 |
| | 4 | 39627 | 136 | 8 |
| | 5 | 38556 | 136 | 8 |
| | 6 | 37485 | 136 | 8 |
| | 7 | 36414 | 136 | 8 |
| | 8 | 35343 | 119 | 7 |
| | 9 | 34272 | 119 | 7 |
| | 10 | 33201 | 119 | 7 |
| | 11 | 32130 | 119 | 7 |
| | 12 | 31059 | 119 | 7 |
| | 13 | 29988 | 102 | 6 |
| | 14 | 28917 | 102 | 6 |
| | 15 | 27846 | 102 | 6 |
| | 16 | 26775 | 102 | 6 |
| INNER | 17 | 25704 | 85 | 5 |

FIG. 8

| | ZONE NO. | THE NUMBER OF DATA SECTORS | THE NUMBER OF SPACE SECTORS | THE NUMBER OF SPARE LOGICAL TRACKS |
|---|---|---|---|---|
| OUTER | 0 | 43911 | 158 | 9.3 |
| | 1 | 42840 | 154 | 9.0 |
| | 2 | 41769 | 150 | 8.8 |
| | 3 | 40690 | 146 | 8.6 |
| | 4 | 39627 | 142 | 8.4 |
| | 5 | 38556 | 139 | 8.2 |
| | 6 | 37485 | 135 | 7.9 |
| | 7 | 36414 | 131 | 7.7 |
| | 8 | 35343 | 127 | 7.5 |
| | 9 | 34272 | 123 | 7.2 |
| | 10 | 33201 | 119 | 7.0 |
| | 11 | 32130 | 116 | 6.8 |
| | 12 | 31059 | 112 | 6.6 |
| | 13 | 29988 | 108 | 6.4 |
| | 14 | 28917 | 104 | 6.1 |
| | 15 | 27846 | 100 | 5.9 |
| | 16 | 26775 | 96 | 5.6 |
| INNER | 17 | 25704 | 93 | 5.4 |

$$K = \frac{4.6MB}{1283.1MB} = 0.0036$$

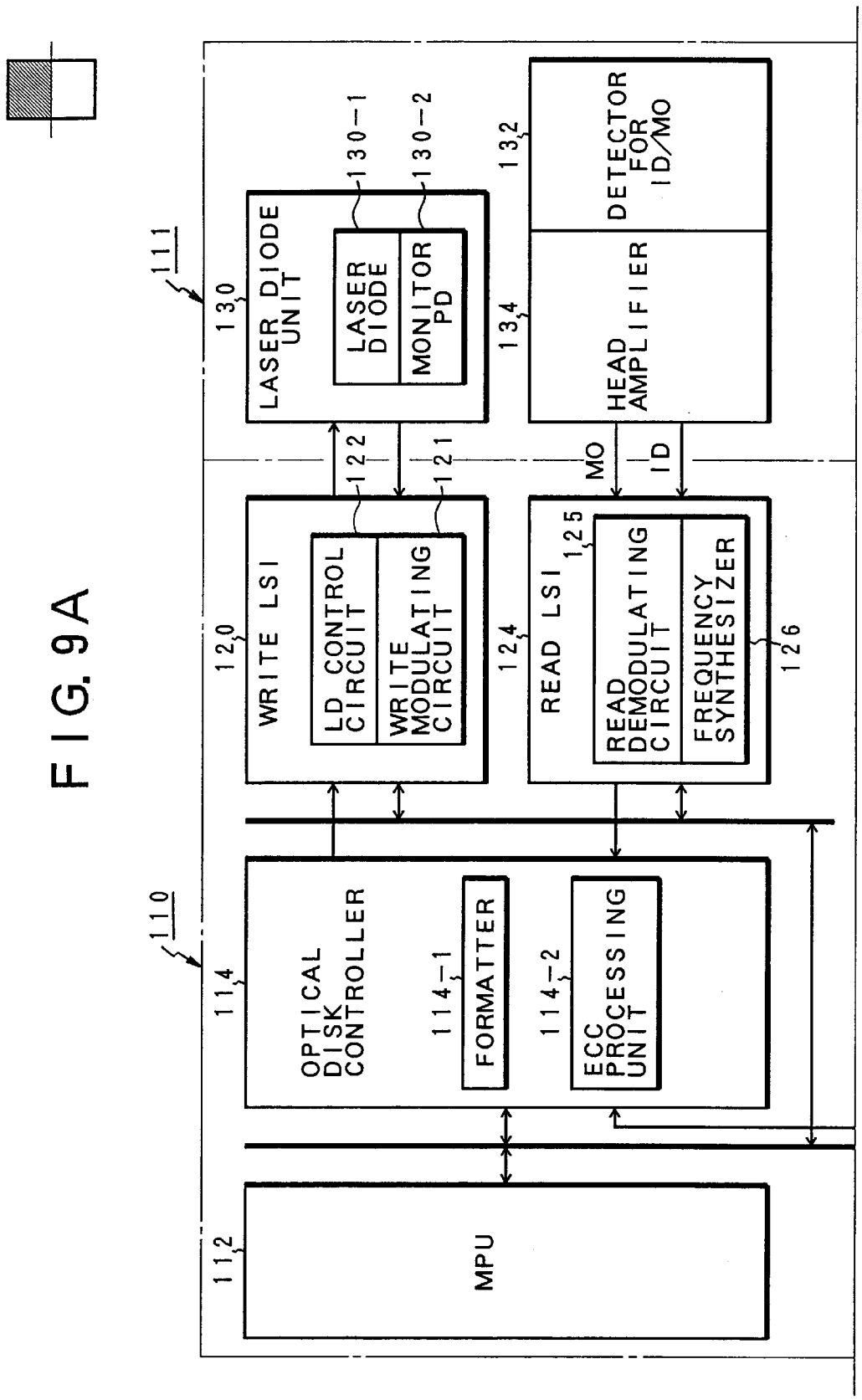

FIG. 18

| ZONE NO. | THE NUMBER OF DATA SECTORS | THE NUMBER OF SPACE SECTORS | THE NUMBER OF SPARE LOGICAL TRACKS |
|---|---|---|---|
| INNER 0 | 21420 | 154 | 9.1 |
| 1 | 22848 | 165 | 9.7 |
| 2 | 24276 | 175 | 10.3 |
| 3 | 25704 | 185 | 10.9 |
| 4 | 27132 | 195 | 11.5 |
| 5 | 28560 | 206 | 12.1 |
| 6 | 29988 | 216 | 12.7 |
| 7 | 31416 | 226 | 13.3 |
| 8 | 32844 | 236 | 13.9 |
| 9 | 34272 | 247 | 14.5 |
| OUTER 10 | 35700 | 257 | 15.0 |

$$K = \frac{4.6MB}{640MB} \fallingdotseq 0.0072$$

SPARE AREA WITH A PREDETERMINED CAPACITY FOR A DETECTIVE SECTOR ALLOCATED IN EACH ZONE

BACKGROUND OF THE INVENTION

1. Field of the Invention

The present invention relates to a recording medium in which a spare area which is used as an alternative to a defective sector is properly arrange, and relates to a storing apparatus. More particularly, the invention relates to a recording medium in which a recording surface is divided into a plurality of zones and an alternate area is provided every zone and relates to a storing apparatus.

2. Description of the Related Arts

Hitherto, as rewritable recording media for optically recording and reproducing information, a magneto-optical recording medium and a phase change recording medium are known. In the magneto-optical recording medium, a magnetic material is used for a recording film, a heating by light and a change in magnetization by a magnetic field are used for recording, and a magneto-optical effect is used for reproduction. In the phase change recording medium, the degree of temperature according to a difference in power by the heating by light is used for recording and a change in reflectance according to a crystal state of the recording film is used for reproduction. In such optical recording media, a spare area to be used as an alternative when a recording area becomes unusable due to a defect on the medium or the like is provided. When the recording area is divided into a plurality of groups, the spare area which is used for alternative use (alternation) is provided at the end of each group. For example, although a magneto-optical disk cartridge of 90 mm and 128 MB according to ISO/IEC 10090 uses the CAV system, the recording area can be divided into groups of arbitrary integers of 1 to 1024 upon formatting. The spare area for alternation is provided at the end of each group and the number of spare sectors per group is the same. The capacity of the spare area which can be arranged on the medium is limited by an interface with an upper apparatus. In case of an SCSI interface, for instance, the number of spare sectors which can be arranged in the medium is limited to 2248 sectors (about 4.6 MB). Consequently, the maximum number of spare sectors which can be arranged in each group is obtained by:

(the number of sectors per group)=(2248 sectors)/(the number of groups)

Since a magneto-optical disk cartridge of 90 mm and 230 MB according to ISO/IEC 13963 uses the ZCAV system, the recording area is divided into 10 zones. All of the zones can be used either as one group or 10 groups by using each zone as one group. When the zones are used as 10 groups, the spare area is provided for every zone and the number of spare sectors per zone is equal to, for example, 204 and is the same. Further, a magneto-optical disk cartridge of 90 mm and 640 MB according to ISO/IEC 15041 also uses the ZCAV system. Therefore, in case of 512 bytes/sector, there are 18 zones. In case of 2048 bytes/sector, there are 11 zones. The spare area for alternation is provided for each zone. In this case as well, the number of spare sectors per zone is the same. For instance, it is equal to 124 sectors in case of 18 zones and is equal to 204 sectors in case of 11 zones.

In the optical recording media as mentioned above, when the recording area is divided into the zones, the spare area for alternation which is allocated to each zone has sectors of the number obtained by dividing a predetermined total number of spare sectors within the maximum number of spare sectors which can be allocated to the medium by the number of zones irrespective of the recording capacity of each zone. On the contrary, since the probability of alternation due to a defect or the like on the medium is uniform at any position, the number of sectors to be alternated in one zone is larger as the position approaches the outer circumference side where the number of sectors in the zone is larger. Consequently, if the spare areas have been fully used for alternation in the same zone, the spare area in another zone is used as an alternation destination. When a defective sector which has been alternated to the spare area of another zone is accessed, however, the reciprocation to/from the other zone is needed for an alternating process and a time which is required to seek becomes long by such an amount. There is a problem that the accessing performance deteriorates.

In the case where the capacity of the optical recording medium is relatively small to be 128 MB or 230 MB, even if a predetermined number of spare sectors are allocated to each zone, a difference between the capacity of the innermost zone and that of the outermost zone is not so large. Even in the zone on the outer side where the capacity is large, a situation such that the self spare area is fully used does not occur. When the capacity of the optical recording medium is increased to, for example, 640 MB, however, if the spare sectors of the same number are arranged, a possibility such that the self spare area is fully used in the zone on the outer side where the capacity is large rises. When the capacity of the optical recording medium is further increased to, for example, 1.3 GB which is twice as large as the capacity of the medium of 640 MB, the possibility such that the self spare area is fully used in the zone on the outer side where the capacity is large further rises. There is a problem that the accessing performance deteriorates by using the spare area, as an alternation destination, in the other zone.

SUMMARY OF THE INVENTION

According to the invention, there is provided a recording medium in which when a spare area which is alternately used is provided every zone, a spare area in the same zone is used as an alternation destination without using a spare area in another zone, thereby enabling the accessing performance to be maintained.

According to the invention, there is provided a recording medium in which data is recorded on a recording surface. The recording medium has a plurality of zones obtained by dividing the recording surface into a plurality of regions in the radial direction and a plurality of spare areas which are provided every zone and are used for alternation of a defective sector, wherein the number of spare logical tracks or the number of spare logical sectors occupied by the spare area in each zone is determined on the basis of a spare ratio K obtained from a total capacity of the spare areas for a total capacity of data areas on the recording surface and a capacity of the data area of each zone. Consequently, the spare area in each zone has a proper capacity according to the data area, an inconvenience such that the spare areas are fully used by the alternation due to a defect on the medium or the like and the spare area in another zone is alternated can be solved even on the outer side where the data capacity is large, and an alternating process effectively utilizing the limited spare areas can be executed even when the data capacity increases. The number of spare logical tracks or the number of spare logical sectors occupied by the spare area in each zone is set to an integer value determined on the basis of a value obtained by multiplying the number of logical tracks or the number of sectors of the data area in each zone by the spare ratio K. The spare ratio not only is set to be constant in each zone but also can be weighted so that the spare ratio increases as the track position approaches the outer circumference. This method is an optimum allocation of the spare areas in which a fact that a margin decreases as the track position approaches the outer circumference is considered. By setting the number of spare logical tracks or the number of spare logical sectors occupied by the spare area in each zone to an integer value as mentioned above, an address conversion at the time of the process for alternating the defective sector becomes easy, and a burden which is required by the alternating process on the storing apparatus side is lightened, so that the process can be executed at a high speed. When the number of user data zones on the recording surface is equal to 18 and the total number of spare logical tracks in the user data zone is equal to 132, the numbers of spare logical tracks of the zones directing from the outer side of user zone toward the inner side are sequentially equal to 9, 9, 9, 9, 8, 8, 8, 8, 7, 7, 7, 7, 7, 6, 6, 6, 6, and 5. When the number of user data zones on the recording surface is equal to 11 and the total number of spare logical tracks in the user data zone is equal to 132, the numbers of spare logical tracks of the zones directing from the outer side of the user zone toward the inner side are sequentially equal to 15, 14, 14, 13, 13, 12, 11, 11, 10, 10, and 9. The recording medium has a recording and reproducing structure of a magnetically induced super resolution (MSR) in which at least a recording layer for recording data at a recording density smaller than a beam diameter of a laser beam and a reproducing layer for reproducing the data recorded in the recording layer by a combination of a reproducing magnetic field and a reproducing laser power are formed on a substrate.

According to another embodiment of the invention, there is provided a recording medium comprising a plurality of zones obtained by dividing a recording surface into a plurality of regions at a pitch interval in the radial direction and a plurality of spare areas which are provided every zone and are used for alternation of a defective sector, wherein the pitch interval of the spare areas of each zone is determined on the basis of a spare ratio K which is obtained from a total capacity of the spare areas for a total capacity of data areas on the recording surface and the pitch interval of each zone. In this case as well, the spare ratio not only is made constant in each zone but also can be weighted so that the spare ratio increases as the track position approaches the outer circumference. The recording medium has a recording and reproducing structure of the magnetically induced super resolution (MSR) in which at least a recording layer for recording data at a recording density smaller than a beam diameter of a laser beam and a reproducing layer for reproducing the data recorded in the recording layer by a combination of a reproducing magnetic field and a reproducing laser power are formed on a substrate.

According to the invention, there is provided a storing apparatus in which when a spare area which is used for alternation is provided every zone in a recording medium, a spare area in the same zone is used as an alternation destination without using the spare area in another zone, thereby enabling the accessing performance to be maintained.

A storing apparatus of the invention comprises a recording unit, a reproducing unit, and a defect processing unit. The recording unit has a plurality of zones obtained by dividing the recording surface into a plurality of regions in the radial direction and a plurality of spare areas which are provided every zone and are used for alternation of a defective sector. The recording unit records data to a recording medium in which a ratio of (the number of spare logical tracks occupied by the spare area in each zone)/(the number of sectors) is determined on the basis of a spare ratio K obtained from a total capacity of the spare areas for a total capacity of data areas on the recording surface and a capacity of the data area of each zone. The reproducing unit reproduces the data on the recording medium. When a defective sector on the recording medium is detected, the defect processing unit allows an alternating process for allocating an alternate sector to a spare area in a zone to which the defective sector belongs and allowing the alternate sector to be used to be executed. That is, when a defective sector due to the format of the recording medium is detected, the defect processing unit allows a subsequent normal sector to be used and executes a slipping process for slipping a sector overflowed from the data area into the spare area in the zone. When a defective sector is detected after the formatting, the defect processing unit executes an alternating process for allocating an alternate sector to the spare area in the zone and allowing the alternate sector to be used. In the recording medium for recording data by the recording unit, the number of spare logical tracks or the number of spare logical sectors occupied by the spare area in each zone is set to an integer value determined on the basis of a value obtained by multiplying the number of logical tracks or the number of sectors of the data area in each zone by the spare ratio K. When the number of user data zones on the recording surface of the recording medium to which data is recorded by the recording unit is equal to 18 and the total number of spare logical tracks in the user data zone is equal to 132, the numbers of spare logical tracks of the zones directing from the outer side of the user zone toward the inner side are sequentially equal to 9, 9, 9, 8, 8, 8, 8, 7, 7, 7, 7, 7, 6, 6, 6, 6, 5, and 5. When the number of the user data zones of the recording surface of the recording medium on which data is recorded by the recording unit is equal to 11 and the total number of spare logical tracks in the user data zone is equal to 132, the numbers of spare logical tracks of the zones directing from the outer side of the user zone toward the inner side are sequentially equal to 15, 14, 14, 13, 13, 12, 11, 11, 10, 10, and 9. The recording medium has a recording and reproducing structure of super resolution (MSR) in which at least a recording layer for recording data at a recording density smaller than a beam diameter of a laser beam and a reproducing layer for reproducing the data recorded on the recording layer by a combination of a reproducing magnetic field and a reproducing laser power are formed on a substrate of the recording medium for recording data by the recording unit. Further, the recording unit or the reproducing unit executes a recording or reproducing control according to the zone CAV system.

According to another embodiment of the storing apparatus of the invention, a recording unit comprises a plurality of zones obtained by dividing a recording surface into a plurality of regions at a pitch interval in the radial direction of the recording surface and a plurality of spare areas which-are provided every zone and are used for alternation of a defective sector. Data is recorded to a recording medium in which the pitch interval of the spare areas of each zone is determined on the basis of a spare ratio K obtained from a total capacity of the spare areas for a total capacity of data areas on the recording surface and the pitch interval of the zones. A reproducing unit reproduces the data recorded on the recording medium. When a defective sector in the recording medium is detected, a defect processing unit allows an alternating process such that an alternate sector is allocated to a spare area in a zone to which the defective sector belongs and the alternate sector is used to be executed. In this case as well, when a defective sector due to the format of the recording medium is detected, the defect processing unit allows the subsequent normal sectors to be used and executes a slipping process for slipping the final sector into the spare area in the zone. When a defective sector is detected after the formatting, an alternating process for allocating an alternate sector to the spare area in the zone and allowing the alternate sector to be used is performed. A recording medium for recording data by the recording unit has a recording and reproducing structure of super resolution (MSR) in which at least a recording layer for recording data at a recording density smaller than a beam diameter of a laser beam and a reproducing layer for reproducing the data recorded on the recording layer by a combination of a reproducing magnetic field and a reproducing laser power are formed on a substrate. Further, a recording unit or a reproducing unit of the storing apparatus executes a recording or reproducing control by the zone CAV system.

The above and other objects, features, and advantages of the present invention will become more apparent from the following detailed description with reference to the drawings.

BRIEF DESCRIPTION OF THE DRAWINGS

FIG. 5 is a format explanatory diagram of a defect management area in FIG. 4;

FIG. 7 is an explanatory diagram of disk map data defining the number of data sectors in each zone, the number of spare sectors, and the number of spare logical tracks with respect to the optical disk of 1.3 GB having the layout in FIG. 4;

FIG. 8 is an explanatory diagram of the number of spare sectors and the number of spare logical tracks calculated on the basis of a ratio of a data capacity and a spare capacity of the optical disk of 1.3 GB;

FIGS. 9A and 9B are block diagrams of an optical disk drive using an optical recording medium of the invention;

FIG. 18 is an explanatory diagram of the number of spare sectors and the number of spare logical tracks calculated on the basis of a ratio of a data capacity and a spare capacity of the optical disk of 640 MB.

DETAILED DESCRIPTION OF THE PREFERRED EMBODIMENT

Figure 1A:
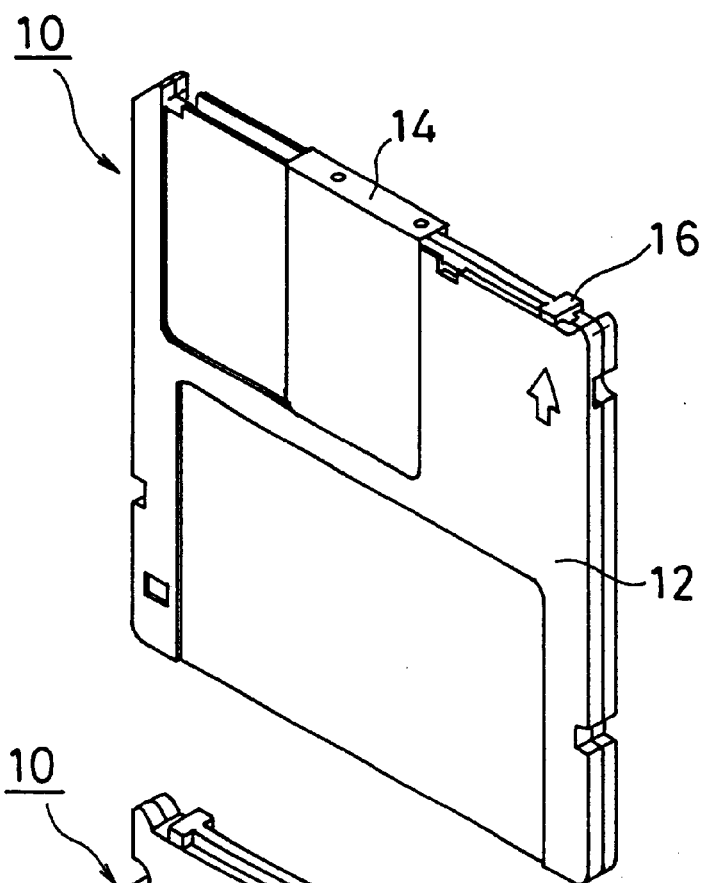
FIGS. 1A and 1B are explanatory diagrams of an optical disk cartridge of 1.3 GB according to an embodiment of an optical recording medium of the invention.
Figure 1B:
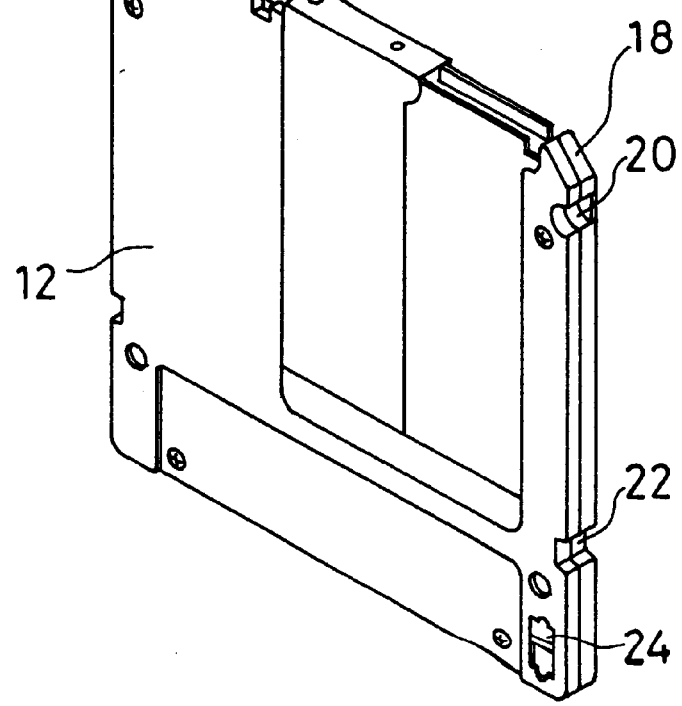

FIGS. 1A and 1B are explanatory diagrams of an optical disk cartridge as an embodiment of an optical recording medium according to the invention. FIG. 1A shows the front side of the cartridge and FIG. 1B shows the back side of the cartridge. On the front side of an optical disk cartridge 10 in FIG. 1A, a shutter 14 is slidably provided in the upper portion of a cartridge main body 12 and a shutter slider 16 is taken out on the left side of the shutter 14. On the back side of the optical disk cartridge 10 in FIG. 1B, a notch 18 for prevention of an erroneous insertion is formed in the right upper corner portion of the cartridge main body 12. An inserting slot 20 is provided under the notch 18. Further, a gripper slot 22 is formed on the lower edge side. A write protection 24 is provided in the lower portion on the back side of the gripper slot 22. The dimensions of the optical disk cartridge 10 conform to the dimensions and shape of an optical disk cartridge of, for example, 90 mm based on ISO/IEC 15041.

Figure 2:
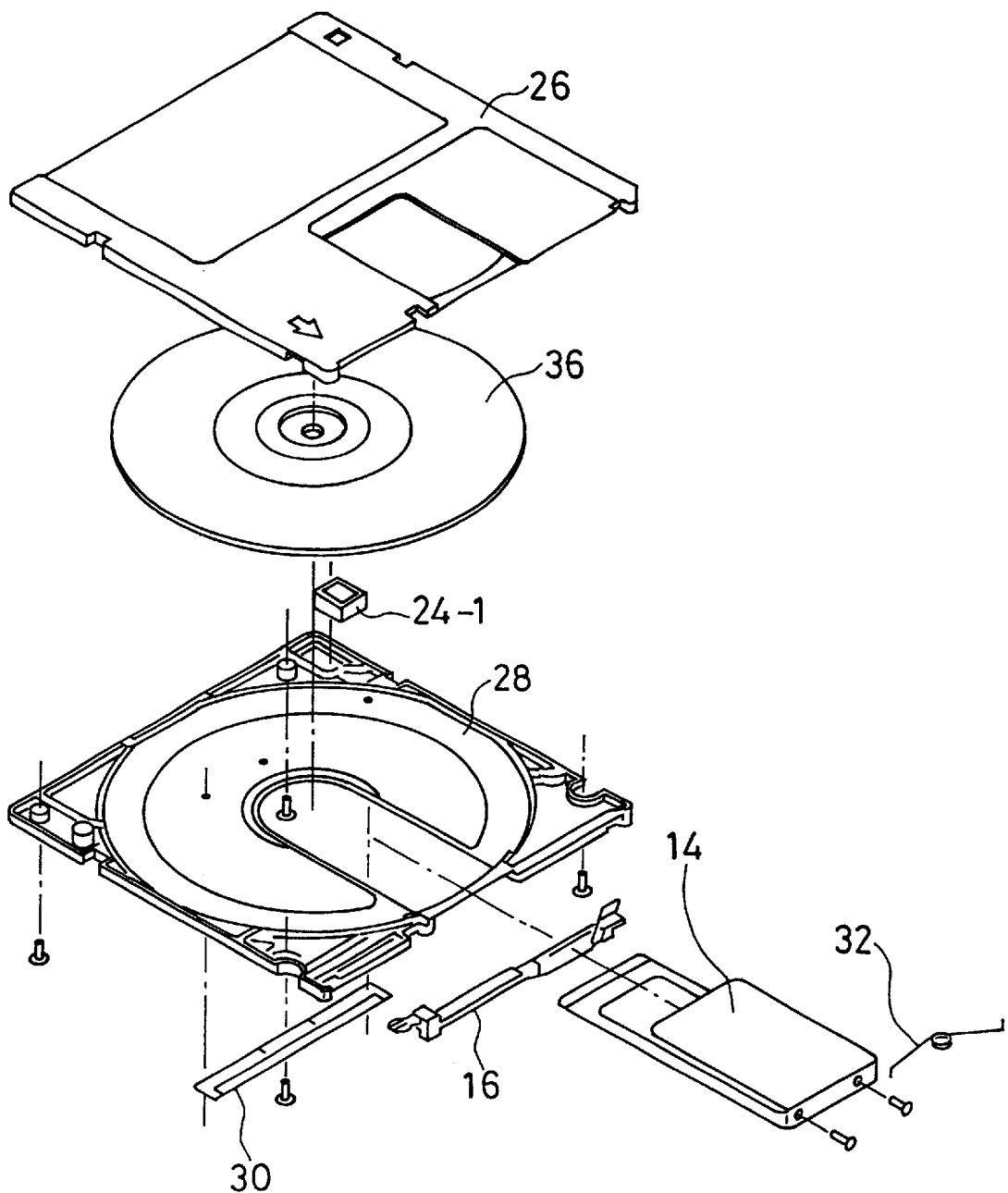
FIG. 2 is an assembling exploded diagram of the optical disk cartridge in FIGS. 1A and 1B.

FIG. 2 is an assembling exploded diagram of the optical disk cartridge 10 in FIGS. 1A and 1B. First, the cartridge main body is constructed by an upper shell 26 and a lower shell 28. The shutter 14 is assembled on the right side of the upper shell 26 and lower shell 28 through the shutter slider 16. The 10 shutter 14 is pressed to a closing position by a shutter spring 32 in the assembling state. A shutter guide 30 is fixed with screws in a state where the shutter 14 is assembled. A write protecting barrel 24-1 is slidably assembled in the corner portion of the lower shell 28, thereby constructing the write protection 24 in FIG. 1B. An optical disk 36 is assembled between the upper shell 26 and lower shell 28. The optical disk 36 has the dimensions and shape according to the optical disk cartridge of 90 mm based on ISO/IEC 15041. A recording system of the optical disk 36 is a double mask RAD-MSR magneto-optical recording and, as for a medium capacity, an unformat capacity is equal to about 1.7 GB (1687.9 MB) and a format capacity is equal to about 1.3 GB (1283.1 MB). In the optical disk 36 using the double mask RAD-MSR magneto-optical recording, a film structure is constructed by a reproducing layer, an intermediate layer, and a recording layer and, when data is recorded, data can be recorded into the recording layer at a recording density smaller than a beam diameter of a laser beam. When the optical disk 36 is reproduced, a reproduction image is controlled by a combination of a reproducing magnetic field and a reproducing laser power and the data which has been recorded in the recording layer and in which a recording density is smaller than the diameter of the laser beam can be reproduced.

Figure 3A:
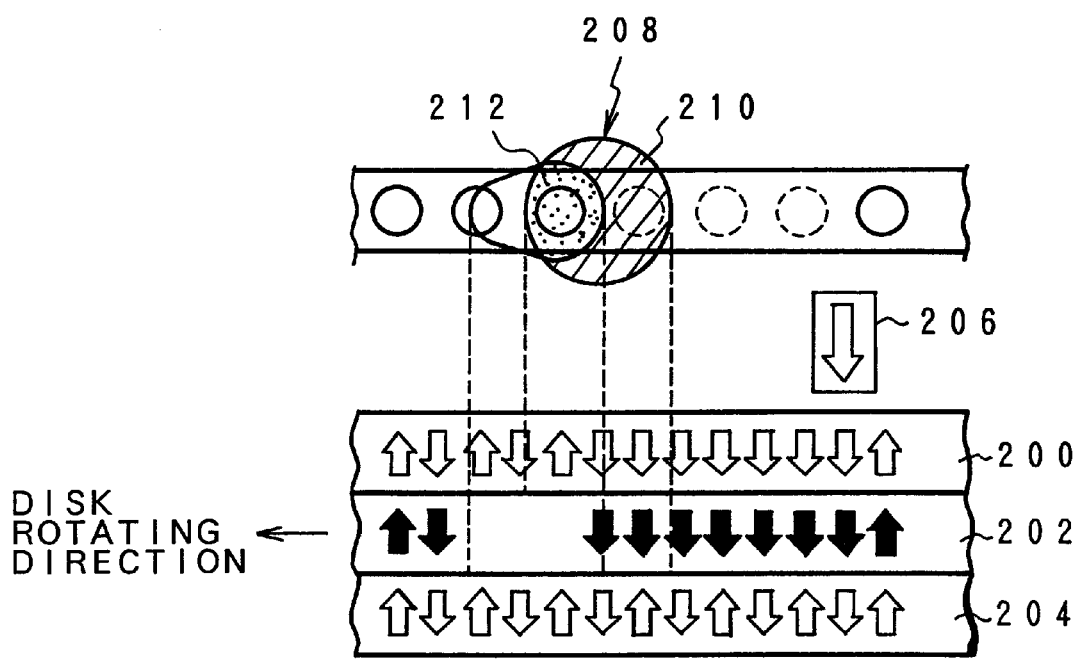
FIGS. 3A and 3B are explanatory diagrams of a reproducing principle of an RAD-MSR system in an optical disk in FIG. 2.
Figure 3B:
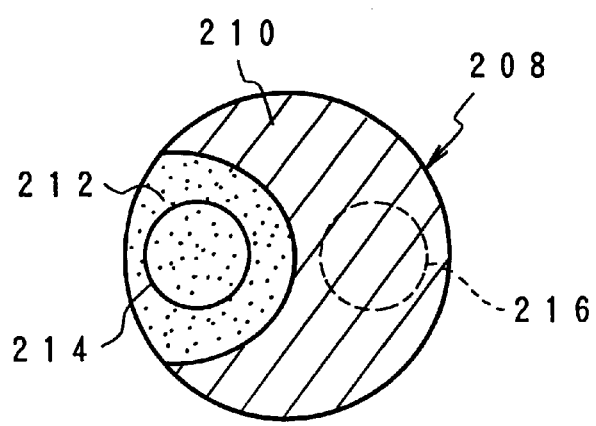

FIGS. 3A and 3B show a principle of the reproducing operation of the double mask RAD-MSR magneto-optical recording. FIG. 3A is a plan view and a cross sectional view of a recording track. A recording film is constructed by a reproducing layer 200, an intermediate layer 202, and a recording layer 204. Magnetization information has been recorded in the recording layer 204 at a recording density smaller than a diameter of a beam spot 208 of a reading beam. Upon reproduction, an initialization for aligning the magnetizing direction of the reproducing layer 200 in which the same magnetization information as that in the recording layer 204 remains upon recording to a predetermined direction is performed by using an initializing magnet 206. A reproducing laser power is applied to the reproducing layer 200 after completion of the initialization, thereby reading. Since a switched connection force among the reproducing layer, intermediate layer, and recording layer is changed due to a temperature distribution of the medium heating by the beam spot 208 of the reading beam, a mask 210 in which initialization magnetization information remains and an opening 212 which is not influenced on the initialization magnetization information by the heating and to which the magnetization information of the recording layer 204 has been transferred are formed in the reproducing layer 200. The magnetization information of the recording layer 204 transferred to the reproducing layer 200 is converted into an optical signal by a magneto-optical effect (Kerr effect or Faraday effect), so that the data is reproduced. In this instance, as shown in FIG. 3B, for a pit 214 of the recording layer 204 which is at present being read out, a pit 216 of the recording layer 204 to be subsequently read out is not transferred by the mask 210 by the initialization magnetization information of the reproducing layer 200. Even if the recording pits 214 and 216 are smaller than the beam spot 208, no crosstalk occurs and the recording pit smaller than the beam diameter can be reproduced.

Figure 4:
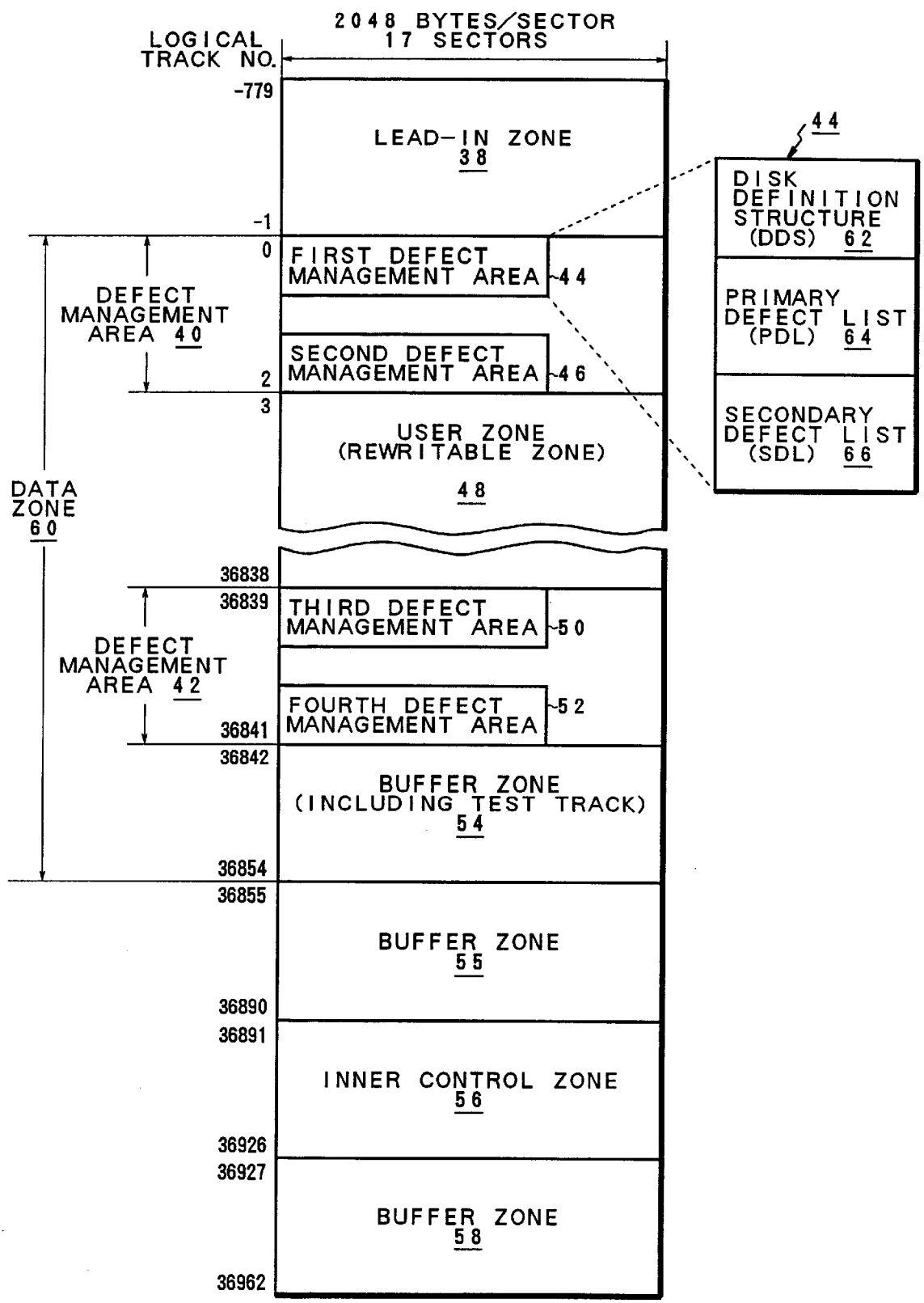
FIG. 4 is an explanatory diagram of a layout of the optical disk of 1.3 GB built in the cartridge in FIG. 2.

FIG. 4 is an explanatory diagram of a disk layout of the optical disk 36 of 1.3 GB built in the optical disk cartridge 10 in FIG. 2. The disk layout is shown by the logical track number of the optical disk 36, one logical track is constructed by 17 sectors, and one sector is constructed by 2048 bytes. The optical disk 36 is based on the zone CAV and the disk layout is constructed by a lead-in zone 38, a defect management area 40, a user zone 48, a defect management area 42, a buffer zone 54 including a test track, a buffer zone 55, an inner control zone 56, and a buffer zone 58 from the outer side. Among them, a region in a range from the defect management area 40 on the outer side to the buffer zone 54 on the inner side relates to a data zone and the other regions correspond to a system zone. A first defect management area (DMA1) 44 and a second defect management area (DMA2) 46 are provided in the defect management area 40 on the outer side for the user zone 48. On the other hand, a third defect management area (DMA3) 50 and a fourth defect management area (DMA4) 52 are provided in the defect management area 42 on the inner side. As shown in a format of FIG. 5, a start position and an end position of each of the first defect management area 44, second defect management area 46, third defect management area 50, and fourth defect management area 52 have been determined. The same contents are recorded in each of the first to fourth defect management areas 44 to 52. Referring again to FIG. 4, as extracted and shown on the right side, the first defect management area 44 is made up of a disk definition structure (DDS) 62, a primary defect list (PDL) 64, and a secondary defect list (SDL) 66. Each of the remaining second defect management area 46, third defect management area 50, and fourth defect management area 52 also has contents similar to the contents of the first defect management area 44. Start addresses of the primary defect list 64 and secondary defect list 66 are stored in the disk definition structure 62 in accordance with a predetermined DDS format. Disk map data (DMD) regarding the data area and spare area in each zone of the user zone 48, which will be clearly described hereinlater has been also stored.

The user zone 48 is a rewritable zone which can be accessed through an SCSI interface or the like from an upper apparatus. As extracted and shown in FIG. 6, the user zone 48 is divided into 18 zones while allocating the zone numbers such as zone 0, 1, 2, 3, . . . , 17 from the outer side. As extracted and shown on the right side with respect to zone 0, each zone is constructed by a data area 68 and a spare area 70. To obtain a constant linear density by the zone CAV, clock frequencies are allocated to the zones 0 to 17 as follows.

| | |
|---|---|
| Zone 0 | 66.27 MHz |
| Zone 1 | 64.66 MHz |
| Zone 2 | 63.04 MHz |
| Zone 3 | 61.42 MHz |
| Zone 4 | 59.81 MHz |
| Zone 5 | 58.19 MHz |
| Zone 6 | 56.27 MHz |
| Zone 7 | 54.96 MHz |
| Zone 8 | 53.34 MHz |
| Zone 9 | 51.72 MHz |
| Zone 10 | 50.11 MHz |
| Zone 11 | 48.49 MHz |
| Zone 12 | 46.88 MHz |
| Zone 13 | 45.26 MHz |
| Zone 14 | 43.64 MHz |
| Zone 15 | 42.03 MHz |
| Zone 16 | 40.41 MHz |
| Zone 17 | 38.79 MHz |

Clock frequencies are allocated to the zones other than the user zone in FIG. 4 as follows.

| | |
|---|---|
| Lead-in | 66.27 MHz |
| Buffer | 38.79 MHz |
| Control | 19.40 MHz |
| Buffer | 37.18 MHz |
| Lead-out | 37.18 MHz |

The total number of spare sectors which can be allocated to the user zone 48 is equal to 2248 sectors in case of the SCSI interface. In the invention, therefore, to set the spare areas on a logical track unit basis, a size of whole spare area of the user zone 48 is set to 2244 sectors (132 logical tracks) whose number is a multiple of 17 sectors because one logical track consists of 17 sectors.

FIG. 7 shows disk map data 72 which is stored into the disk definition structure 62 in FIG. 4 and shows the number of data sectors, the number of spare sectors, and the number of spare logical tracks in 18 zones of zone Nos. 0 to 17. In the actual disk map data 72, since the number of spare logical tracks can be obtained by dividing the number of spare sectors by the number 17 of sectors per track, there is no need to provide the number of spare logical tracks. As will be obviously understood from the disk map data 72, the number of data sectors is the largest at zone No. 0 corresponding to the outermost side and the number of data sectors decreases as the zone position approaches the inner side and is the smallest at zone No. 17 on the innermost side. As for the zone division in the user zone, a range from the radius 24.61 mm of the innermost user area in the optical disk 36 in FIG. 2 to the radius 41.00 mm of the outermost user area is divided in the radial direction at a pitch interval of 0.96 mm. Even if the pitch interval of the zone division is constant, since the number of sectors of the physical track increases as the position approaches the outer side, a relation such that the number of data sectors per zone increases from the inner side toward the outer side as shown in FIG. 7 is derived. For the number of data sectors of each zone as mentioned above, 2244 sectors as the total number of spare sectors are allocated in a manner such that the spare sectors become the minimum at zone No. 17 on the inner side and becomes the maximum at zone No. 0 on the outer side. When the number of spare sectors of each zone is considered as the number of spare logical tracks, the number of spare logical tracks is similarly allocated in a manner such that it becomes the minimum at zone No. 17 on the innermost side and becomes the maximum at zone No. 0 on the outermost side.

The allocation of the number of spare sectors and the number of spare logical tracks per zone in the disk map data 72 in FIG. 7 is performed on the basis of FIG. 8. In FIG. 8, the numbers of data sectors at zone Nos. 0 to 17 are determined as shown in the diagram. The total number of spare sectors for them is calculated on the basis of a spare ratio K which is defined as a ratio of the total number 2244 of spare sectors allocated to the medium which are occupied in the total capacity 1.3 GB of data of the user zone of the medium. Now, assuming that the total capacity of data of the user zone of the medium is shown by D1 and the total capacity of spares allocated to the medium is labelled as D2, D1=1.2831 GB and D2=2244 sectors×2048 bytes=4.595712 MB. Therefore, the spare ratio K is calculated as follows.

$$K = D2/D1 \\ = 4.595712/1283.1 \\ = \text{about } 0.0036$$

Therefore, by multiplying the number of data sectors per zone by the spare ratio K=0.0036 in FIG. 8, the number of spare sectors per zone can be calculated as shown in the diagram. By dividing the number of spare sectors calculated as mentioned above by 17 sectors in order to convert into the number of spare logical tracks, the value of the number of spare logical tracks shown in the diagram is obtained. For the number of spare logical tracks in FIG. 8, in the invention, since the spare area is distributed on a unit basis of the logical track serving as 17 sectors, by rounding off the fractions below the decimal point of the number of spare logical tracks in FIG. 8, the number of logical tracks in FIG. 7 can be defined. It will be obviously understood that the total number of spare logical tracks in FIG. 7 is equal to the total number 132 of spare logical tracks corresponding to the total number 2244 of spare sectors. If the number of spare logical tracks can be calculated, by multiplying each of the numbers of spare logical tracks by the number 17 of sectors per logical track, the number of spare sectors at each of zone Nos. 0 to 17 in FIG. 7 can be decided. The allocation of the number of spare sectors and the number of spare logical tracks per zone according to the invention as mentioned above corresponds to that the spare area is allocated so that the spare ratio K of the data area for the spare area in each zone is almost equal to K=0.0036 with regard to all of the zones as will be obviously understood from FIG. 8. In this case, such an allocation ideally becomes the allocation of the spare area per zone like the number of spare sectors in FIG. 8. However, as shown in FIG. 4, since the disk layout has been performed by the logical track number and if the spare area is managed on a logical track unit basis, processes such as address conversion and the like can be easily performed. Therefore, by setting the number of spare sectors in FIG. 8 to a multiple of the number of sectors of the logical track as shown in FIG. 7, the spare sectors are allocated on a logical track unit basis.

In the optical recording medium of the invention, the allocation of the spare area in each zone is almost the same as the spare ratio K between the total capacity of data in the user zone and the total capacity of spare areas allocated. Therefore, an inconvenience such that the self spare areas are fully used due to the defect in the zone on the outer side of a large capacity and they are alternated by the spare areas of the other zone in the case where the spare sectors of the same number are arranged to each zone as in the conventional apparatus is certainly prevented. By using the spare area in the zone as an alternation destination, the deterioration in accessing performance in the defect process can be certainly prevented. As another embodiment such that the spare areas are allocated every zone so as to obtain the spare ratio K of the total capacity of spare to the total capacity of data of the medium as shown in FIG. 7, since the zone division is performed at the same pitch interval of 0.96 mm in the radial direction of the optical disk medium, the spare area can be also allocated by setting a predetermined spare pitch interval from the zone boundary on the inner side, for example, in the radial direction into the pitch interval of each zone. For instance, now assuming that the pitch interval in the radial direction of each zone is set to 0.96 mm, by multiplying this pitch interval by the spare ratio K=0.0036 of the total capacity of spares occupied in the total data capacity calculated in FIG. 7, 0.0035 mm is allocated as a spare pitch interval. Thus, it is possible to realize the same allocation of the number of spare sectors and the number of spare logical tracks of each zone as that in FIG. 7 in which the spare area decreases on the inner side and the spare area increases as the position approaches the outer side.

Figure 9B:
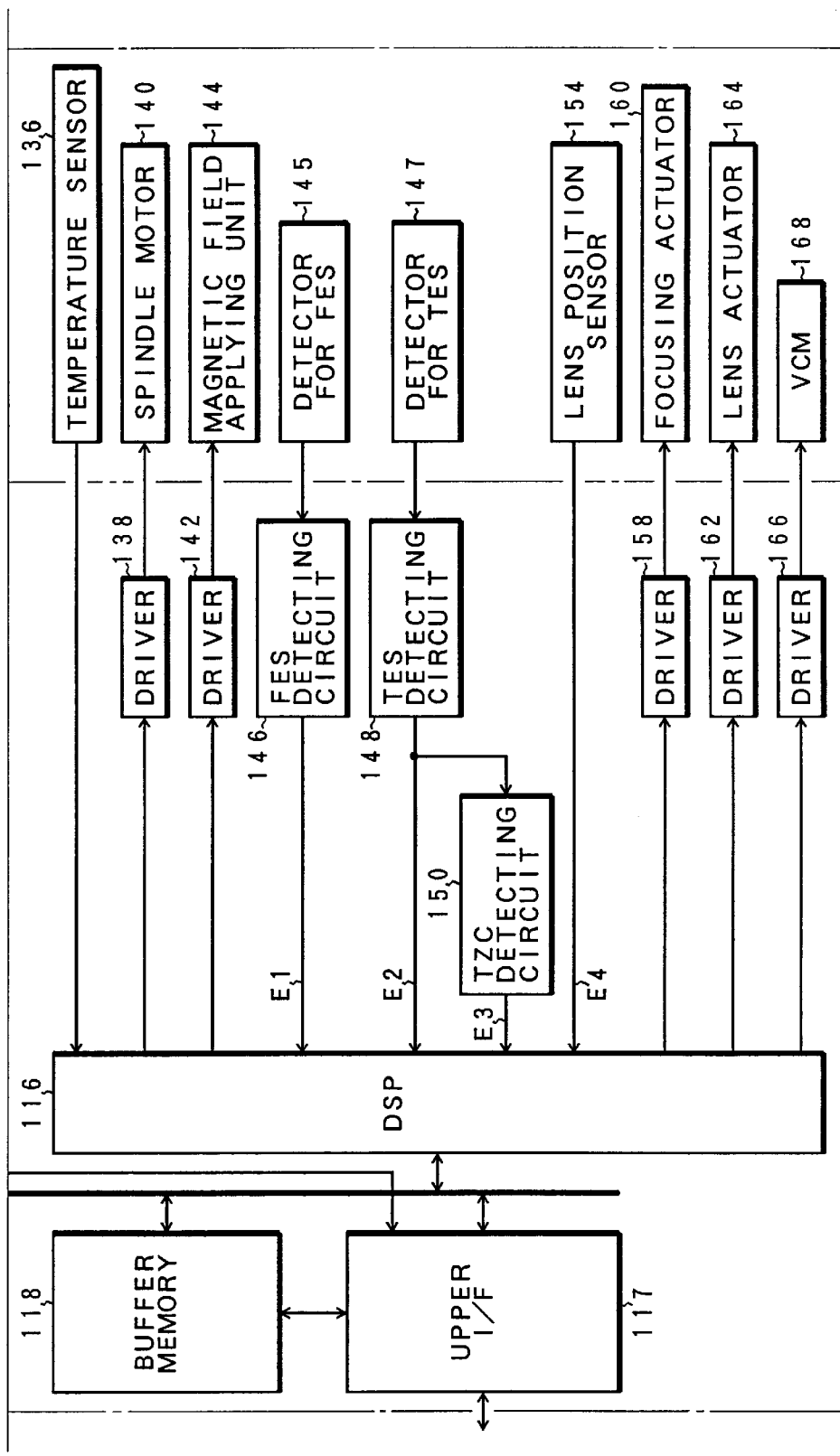

FIGS. 9A and 9B are circuit block diagrams of an optical disk drive serving as an optical storing apparatus of the invention. The optical disk drive of the invention is constructed by a control unit 110 and an enclosure 111. The control unit 110 has: an MPU 112 to control the whole optical disk drive; an interface 117 to transmit and receive commands and data to/from an upper apparatus; an optical disk controller (ODC) 114 to perform processes which are necessary to read and write data from/to the optical disk medium; a DSP 116; and a buffer memory 118. A formatter 114-1 and an ECC processing unit 114-2 are provided in the optical disk controller 114. At the time of write access, the formatter 114-1 divides NRZ write data on a sector unit basis of the medium and forms a recording format. The ECC processing unit 114-2 forms an ECC code on a sector write data unit basis and adds and, further, forms a CRC code and adds if necessary. Moreover, sector data after completion of the ECC encoding is converted into, for example, a 1-7 RLL code. Upon read access, demodulated sector read data is inversely converted from the 1-7 RLL code and a CRC check is performed by the ECC processing unit 114-2. After that, error detection and correction are performed. Further, NRZ data of a sector unit is connected by the formatter 114-1 so as to obtain a stream of the NRZ read data. This stream of NRZ read data is transferred to the upper apparatus. A write LSI 120 is provided for the optical disk controller 114. A write modulating circuit 121 and a laser diode control circuit 122 are provided for the write LSI 120. A control output of the laser diode control circuit 122 is supplied to a laser diode unit 130 provided in the optical unit on the enclosure 111 side. The laser diode unit 130 integratedly has a laser diode 130-1 and a detector 130-2 for monitoring. The write modulating circuit 121 converts write data to a data format of the PPM recording or PWM recording. As an optical disk in which the recording and reproduction are performed by using the laser diode unit 130, namely, as a rewritable MO cartridge medium, in the embodiment, the magneto-optical recording medium (RAD medium) having the reproducing layer, intermediate layer, and recording layer of the RAD system in FIGS. 3A and 3B is used. The invention can also cope with a magneto-optical recording medium (FAD medium) having a reproducing layer, a switching layer, and a recording layer of the FAD system. A recording format of the medium is the zone CAV. Further, as a recording system of the medium, the pit position recording (PPM recording) in which data is recorded in correspondence to the presence or absence of a mark on the medium or the pulse width recording (PWM recording) in which edges of a mark, namely, a leading edge and a trailing edge are made correspond to data is used. When the MO cartridge medium is loaded into the optical disk drive, an ID portion of the medium is first read out, the MPU 112 recognizes the kind of medium from a pit interval, and a kind result is notified to the write LSI 120. Sector write data from the optical disk controller 114 is converted into PWM recording data by the write modulating circuit 121. The PWM recording data converted by the write modulating circuit 121 is transmitted to the laser diode control circuit 122 and is written to the medium by the light emission driving of the laser diode 130-1. A read LSI 124 is provided as a reading system for the optical disk controller 114. A read demodulating circuit 125 and a frequency synthesizer 126 are built in the read LSI 124. A photosensitive signal of the return light of the beam from the laser diode 130-1 by a detector 132 for ID/MO provided for the enclosure 111 is inputted as an ID signal and an MO signal to the read LSI 124 through a head amplifier 134. Circuit functions of an AGC circuit, a filter, a sector mark detecting circuit, and the like are provided for the read demodulating circuit 125 of the read LSI 124. A read clock and read data are formed from the inputted ID signal and MO signal and the PWM recording data is demodulated to the original NRZ data. Since the zone CAV is used as a control system of a spindle motor 140, a setting control of a frequency dividing ratio for allowing the frequency synthesizer 126 built in the read LSI 124 to generate a zone corresponding clock frequency is performed from the MPU 112. The frequency synthesizer 126 is a PLL circuit having a programmable frequency divider and generates a reference clock having a peculiar frequency which has been predetermined in accordance with the zone position of the medium as a read clock. The read data demodulated by the read LSI 124 is supplied to the optical disk controller 114 and an inverse conversion of the 1-7 RLL code is performed. After that, the read data is subjected to a CRC check ad and an ECC process by an encoding function of the ECC processing unit 114-2, so that NRZ sector data is reconstructed and is connected to the stream of the NRZ read data by the formatter 114-1. After that, the resultant data is transferred to the upper apparatus by the upper interface 117 via the buffer memory 118. A detection signal of a temperature sensor 136 provided on the enclosure 111 side is inputted to the MPU 112 via the DSP 116. The MPU 112 controls each of the light emitting powers for reading, writing, and erasing in the laser diode control circuit 122 to the optimum value on the basis of an environment temperature in the apparatus detected by the temperature sensor 136. The MPU 112 controls the spindle motor 140 provided on the enclosure 111 side by a driver 138 via the DSP 116. Since the recording format of the MO cartridge is the zone CAV, the spindle motor 140 is rotated at a constant speed of, for example, 3600 rpm. The MPU 112 controls a magnetic field applying unit 144 provided on the enclosure 111 side by a driver 142 via the DSP 116. The magnetic field applying unit 144 is arranged on the opposite side of the beam irradiating side of the MO cartridge loaded in the apparatus and supplies an external magnetic field to the medium at the time of recording, erasure, and reproduction. Although an electromagnet is ordinarily used as a magnetic field applying unit 144, another permanent magnet or, further, a combination of an electromagnet and a permanent magnet can be also used. The external magnetic field upon reproduction by the magnetic field applying unit 144 is an initializing magnetic field Hi with respect to the RAD medium and is a reproducing magnetic field Hr with regard to the FAD medium. Further, the external magnetic field by the magnetic field applying unit 144 upon reproduction is always collated to a set of the optimum values of a reproducing magnetic field and a reproducing laser power by a calibration processing unit which is realized as a processing function of the MPU 112. The DSP 116 has a servo function to position the beam from the laser diode 130-1 to the medium and executes a seek control for seeking the beam to a target track so as to enter an on-track state. The seek control can be simultaneously executed in parallel with the write access or read access in response to an upper command by the MPU 112. To realize the servo function of the DSP 116, a detector 145 for FES to receive the beam return light from the medium is provided for the optical unit on the enclosure 111 side. An FES detecting circuit (focusing error signal detecting circuit) 146 forms a focusing error signal E1 from a photosensitive output of the detector 145 for FES and inputs to the DSP 116. A detector 147 for TES to receive the beam return light from the medium is provided for the optical unit on the enclosure 111 side. A TES detecting circuit (tracking error signal detecting circuit) 148 forms a tracking error signal E2 from a photosensitive output of the detector 147 for TES and inputs to the DSP 116. The tracking error signal E2 is inputted to a TZC detecting circuit (track zero-cross point detecting circuit) 150. A track zero-cross pulse E3 is formed and inputted to the DSP 116. A lens position sensor 154 to detect the lens position of an objective lens for irradiating a laser beam to the medium is provided on the enclosure 111 side and supplies a lens position detection signal (LPOS) E4 to the DSP 116. Further, to control the position of the beam spot on the medium, the DSP 116 controls a focusing actuator 160, a lens actuator 164, and a VCM 168 through drivers 158, 162, and 166.

Figure 6:
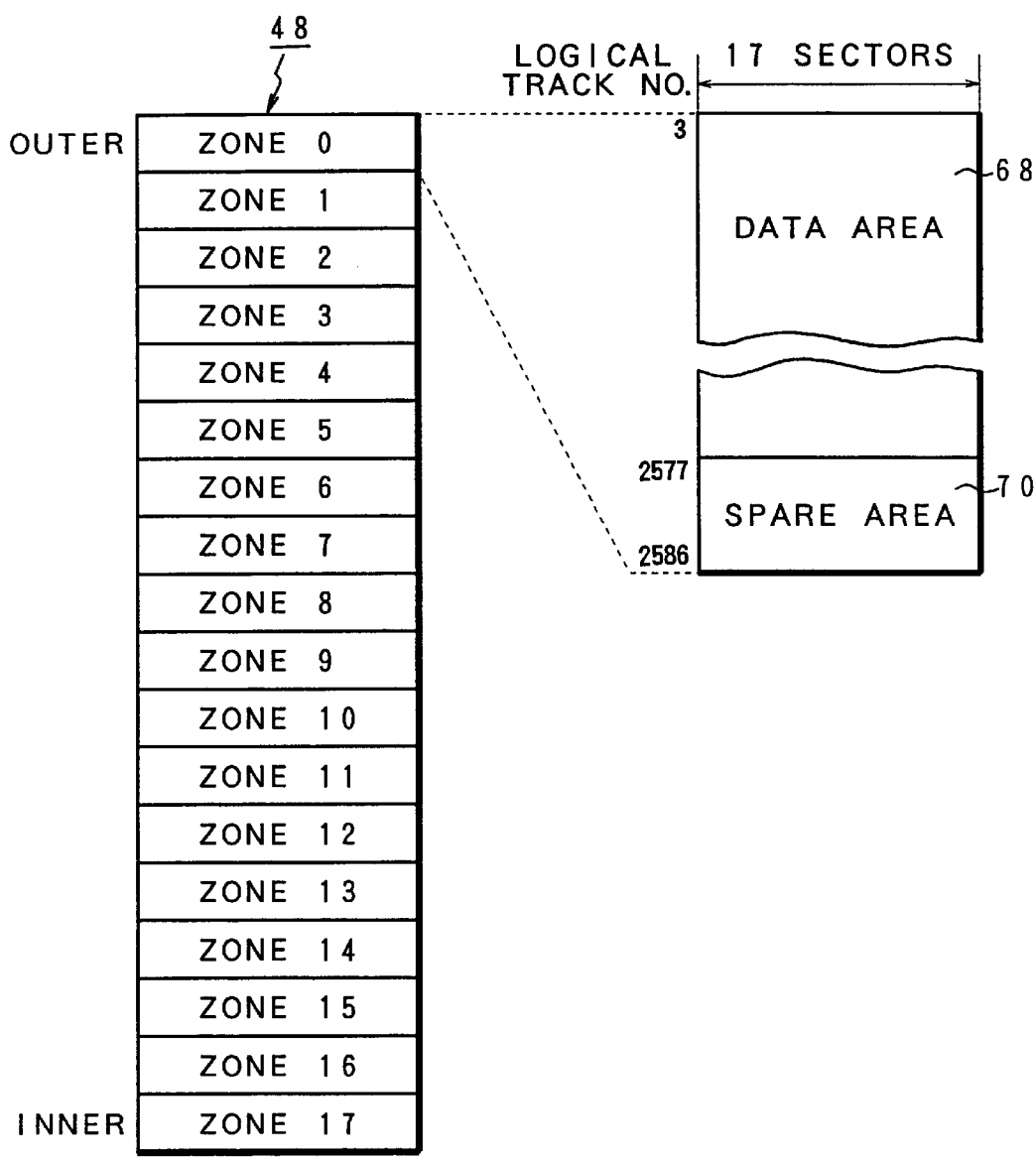
FIG. 6 is an explanatory diagram of a zone division of a user area in FIG. 4 and a spare area in the zone.
Figure 10:
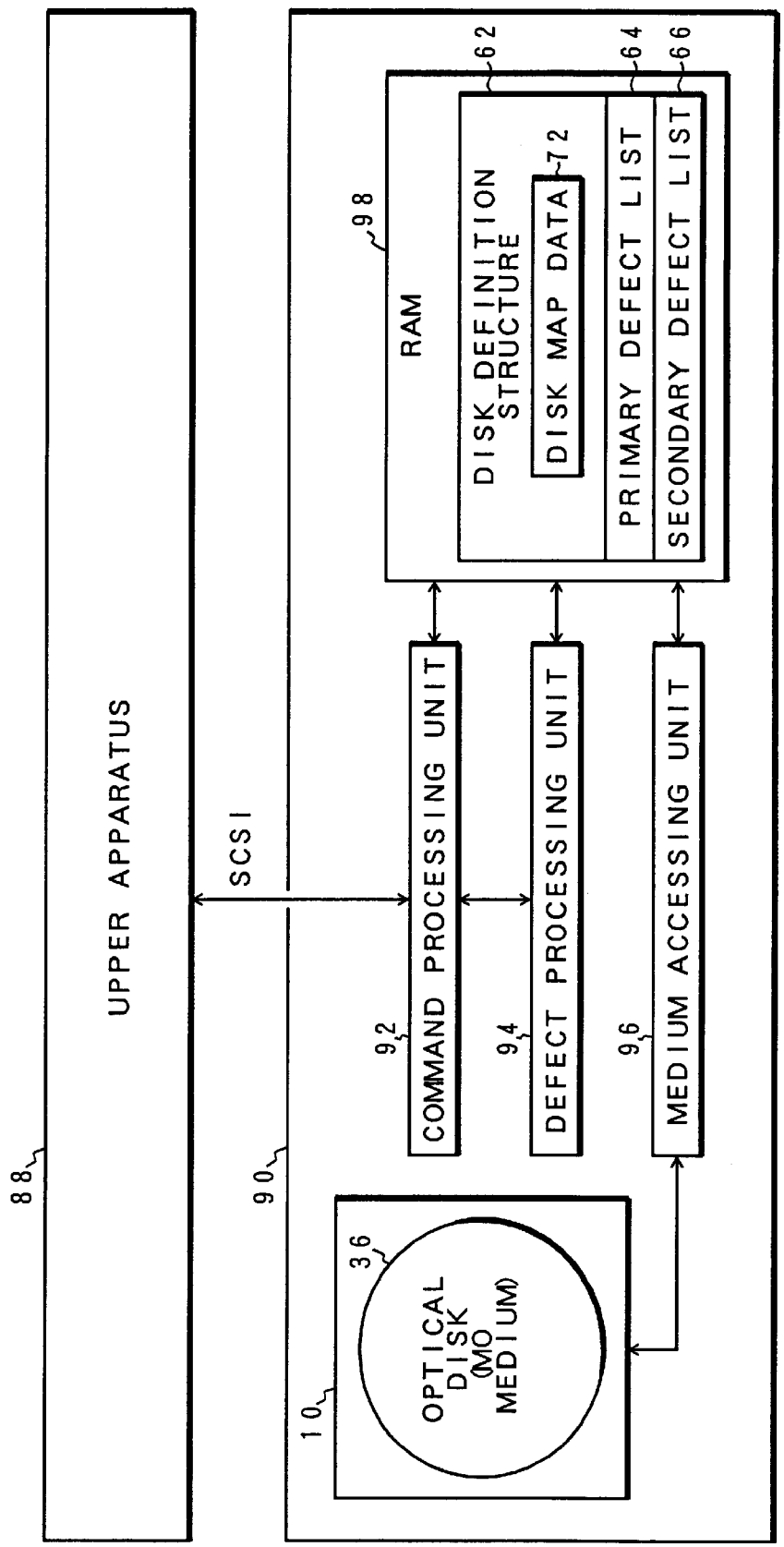
FIG. 10 is a functional block diagram of an optical recording apparatus of the invention for performing a slipping process and an alternating process of a defective sector on the basis of the disk map data in FIG. 7.

FIG. 10 is a functional block diagram of the optical storing apparatus of the invention for executing a slip process and an alternating process of a defective sector on the basis of the disk map data in FIG. 6. An optical disk drive 90 is connected to an upper apparatus (host) 88 through, for example, the SCSI interface. In the optical disk drive 90, functions of a command processing unit 92, a defect processing unit 94, and a medium accessing unit 96 are realized by a program control by the MPU 112 in FIGS. 9A and 9B. The command processing unit 92 receives commands from the upper apparatus 88 by the SCSI interface and executes the reading or writing operation after formatting the optical disk 36 enclosed in the optical disk cartridge 10. When a formatting command is received by the command processing unit 92 and a defective sector is detected during the execution of the formatting of the optical disk 36, the defect processing unit 94 registers a defect position address into the primary defect list 64 in the defect management area 44 developed in an RAM 98. The defect position address is defined by a logical track address and a sector address. When one address of the defective sector is registered into the primary defect list 64 as mentioned above, a slip process for using a next normal sector of the defective sector as an alternate sector is performed. Therefore, the data area 68 shown in FIG. 6 is arranged so that the last portion corresponding to only an amount of the defective sector enters the spare area 70. When a write command is received by the command processing unit 92 after completion of the formatting of the optical disk 36 and the defective sector is detected by the access of the designated sector of the write command, the position address of the defective sector is registered into the secondary defect list 66. The position address of the alternate sector in the spare area 70 serving as an alternation destination of the defective sector is also registered. Further, when the write command or read command is received by the command processing unit 92, the defect processing unit 94 first refers to the primary defect list 64 by the address of the receiving command. When it is recognized that the sector is the defective sector by referring to the primary defect list 64, a slip process for reading or writing from/to the first normal sector subsequent to the defective sector is executed. If the sector is not the defective sector with reference to the primary defect list 64 by the address of the read command or write command, the secondary defect list 66 is referred. When the defective sector is detected with reference to the secondary defect list 66, a position address of the alternate sector stored as a set together with the position address of the defective sector is obtained and the read access or write access for the alternate sector in the spare area is performed.

Figure 11A:
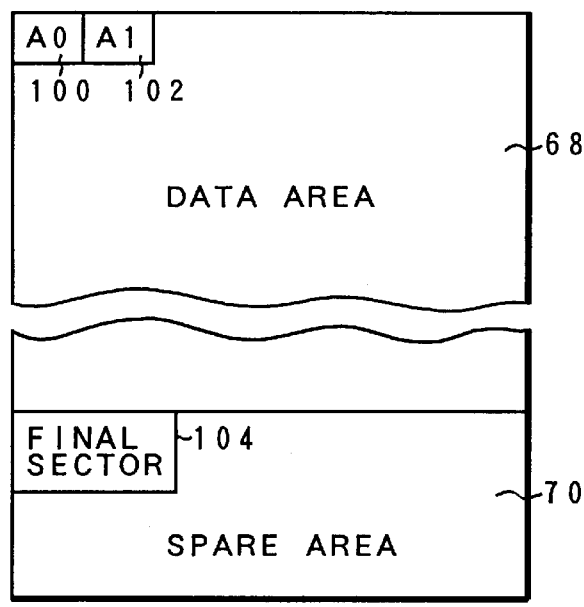
FIGS. 11A to 11C are explanatory diagrams of a slipping process using a primary defect list PDL at the time of formatting by a defect processing unit in FIG. 10 and an alternating process using a secondary defect list SDL after completion of the formatting.
Figure 11B:
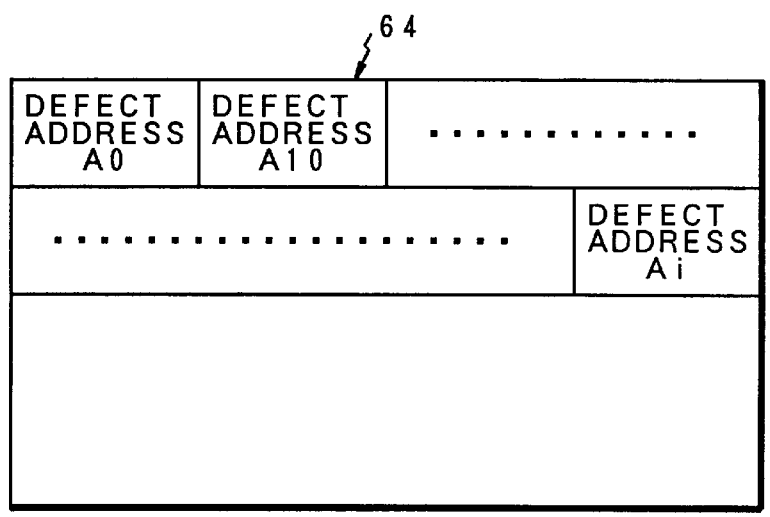
Figure 11C:
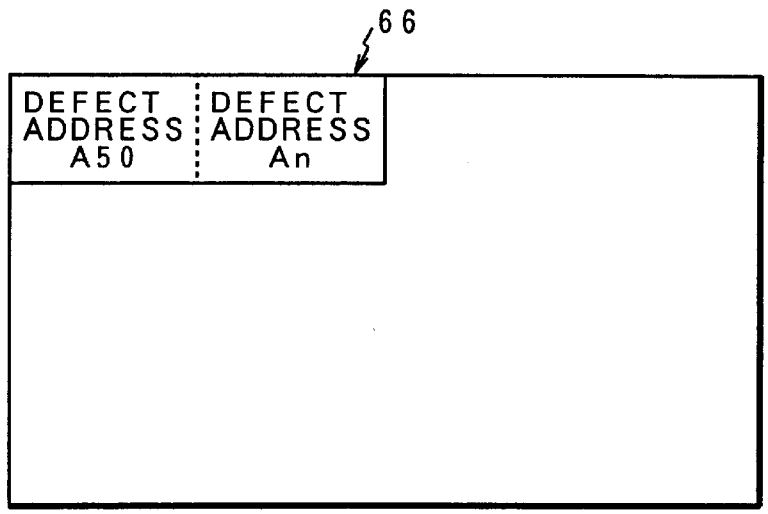

FIGS. 11A to 11C are explanatory diagrams of a defect process by the defect processing unit 94 in FIG. 10. FIG. 11A shows the data area 68 and spare area 70 of a certain zone. FIG. 11B shows the primary defect list 64. Further, FIG. 11C shows the secondary defect list 66. First, it is assumed that when a sector formatting of a head sector 100 having address A0 in FIG. 11A is performed by the formatting process, it cannot be formatted and it is recognized that this sector is a defective sector. By the detection of the defective sector 100 in association with the formatting, the defect processing unit 94 registers defect address A0 of the defective sector 100 into the primary defect list 64 in FIG. 11B. A final sector 104 in the data area 68 in FIG. 11A is slipped into the spare area 70 by only an amount of the defective sector 100 in response to the registration of defect address A0 to the primary defect list 64. When the sector formatting is finished with respect to the data area 68, for example, as shown in FIG. 11B, defect addresses A0, A10, . . . , and Ai are stored. Now assuming that, for example, the head sector 100 in the data area 68 is subsequently accessed by a read/write command after completion of the formatting, the primary defect list 64 is referred by access address A0 at this time. When referring to the primary defect list 64, it will be understood that access address A0 has been registered as defect address A0 and the access sector 100 is the defective sector. In this case, therefore, the sector is slipped to a normal sector subsequent to next address A1 and the access is performed to this slip sector 102. Whether the slip sector 102 subsequent to the defective sector 100 is normal or not can be known by discriminating whether address A1 of slip sector 102 has been registered after defect address A0 in the Id primary defect list 64 or not. In this case, defect address A10 has been registered after defect address A0 and it will be understood that the sectors of addresses A1 to A9 are normal. It is now assumed that, for example, when sector address A50 in the data area 68 is accessed by the write command after completion of the formatting, it is found that sector address A50 indicates the defective sector. When it is detected that sector address A50 indicates the defective sector as mentioned above, defect address A10 is registered into the last space sector in the secondary defect list 66 as shown in FIG. 11C. Further, alternate address An in which the first space sector in the spare area 70 is set to the alternate sector is combined with defect address A50 and registered. That is, the position addresses of the defect source and the alternation destination are registered. With respect to the defective sector registered into the secondary defect list 66 after the formatting, at the time of access of address A50 by the read/write command, defect address A50 is recognized with reference to the secondary defect list 66 after referring to the primary defect list 64 and the access is performed to alternate address A0 which could simultaneously been obtained, namely, to the alternate sector in the spare area 70.

Figure 12:
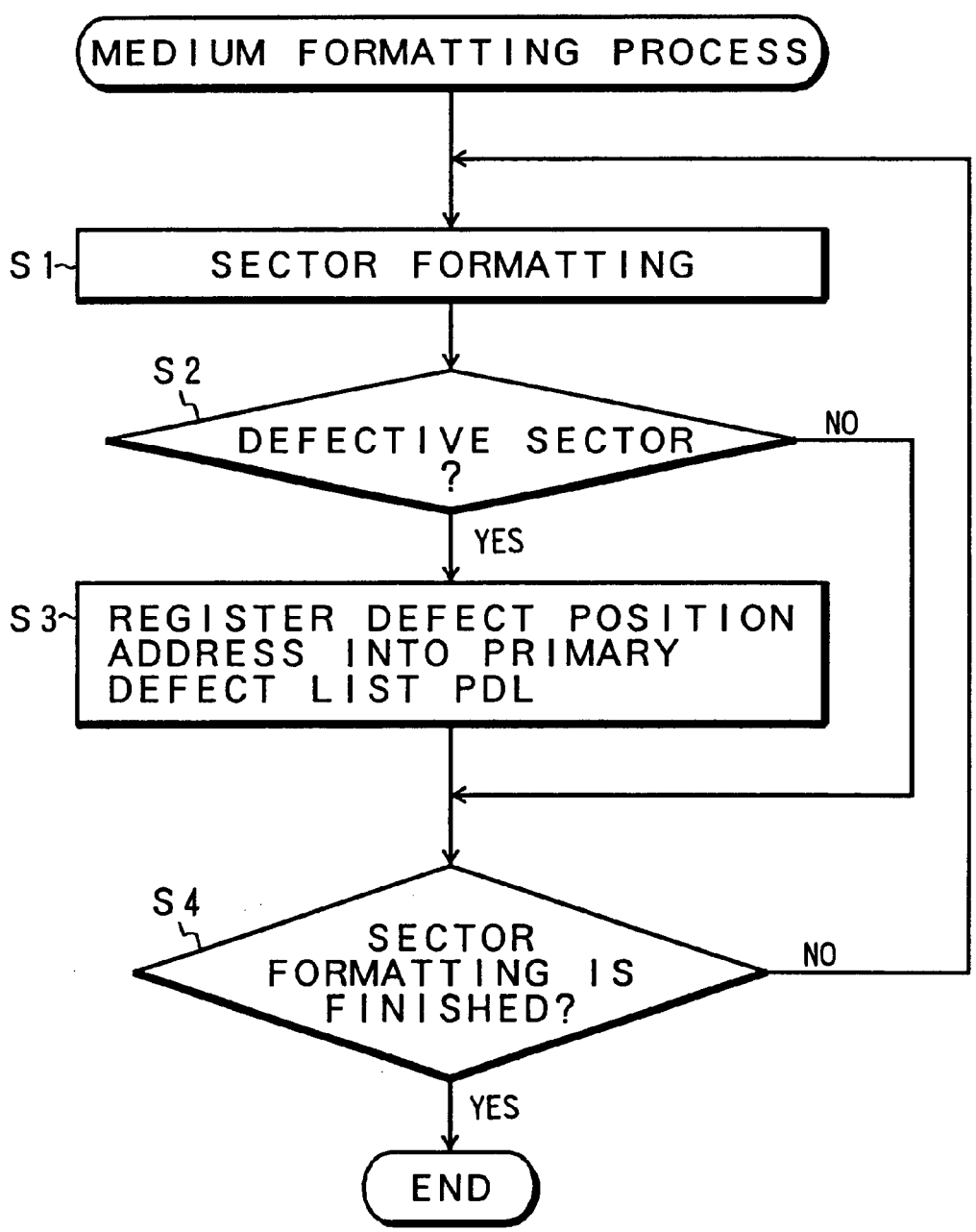
FIG. 12 is a flowchart for a medium formatting process by the defect processing unit in FIG. 10.

FIG. 12 is a flowchart for the medium formatting process in the optical disk drive 90 in FIG. 10. In the medium formatting process, in step S1, the sector formatting is started from the head of the data area 68. When the defective sector is detected in step S2, step S3 follows and the defect position address is registered into the primary defect list 64. The processes in steps S1 to S3 are repeated until the formatting of all of the zones is finished in step S4. The sector formatting of the spare area 70 is obviously executed subsequently to the data area 68 in FIG. 11A. As for the defective sector of the spare area 70, although the defect position address is registered to the primary defect list 64, the slip of the final sector of the spare area is not performed.

Figure 13:
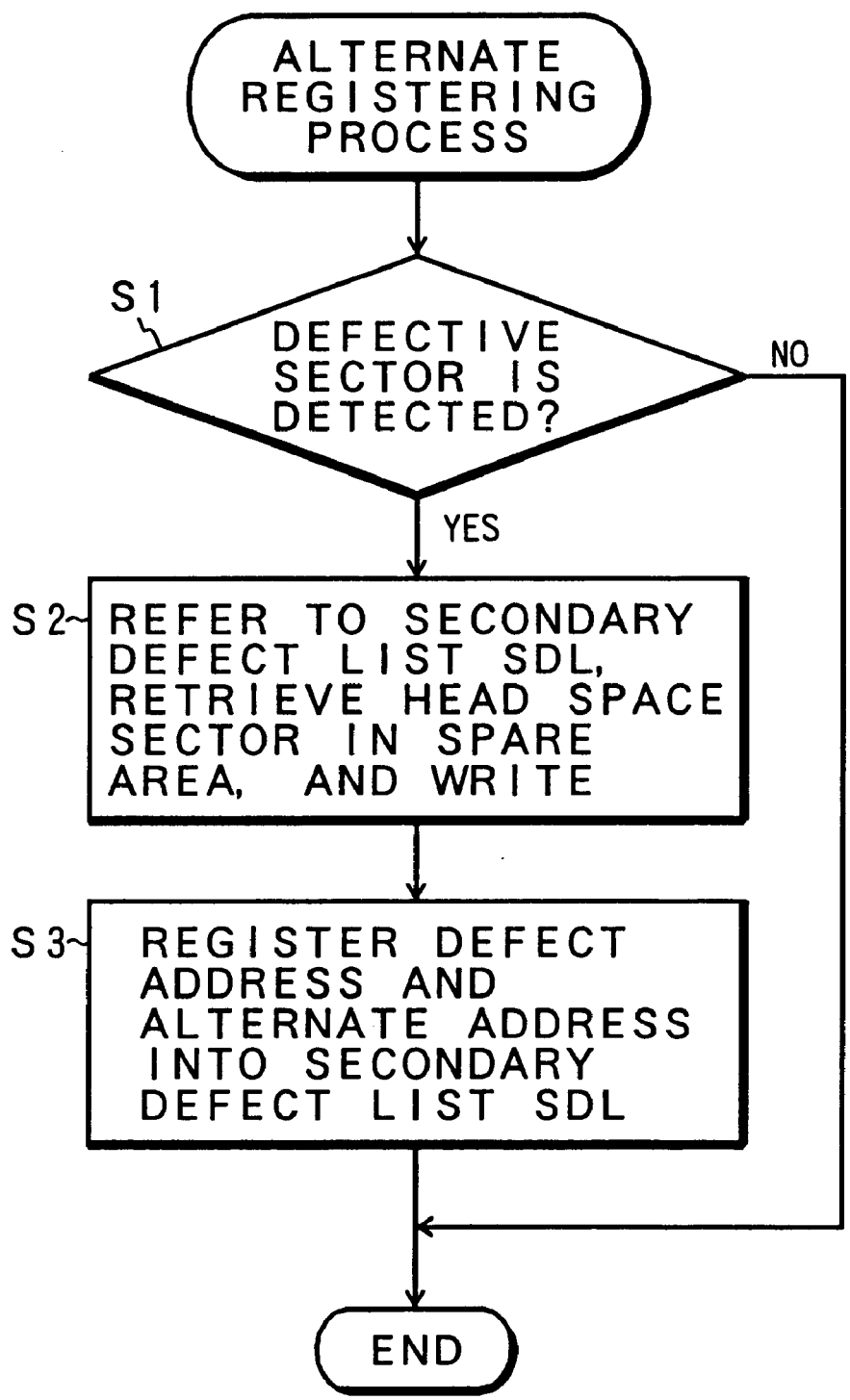
FIG. 13 is a flowchart for an alternate registering process by the defect processing unit in FIG. 10.

FIG. 13 is a flowchart for the alternate registering process by the defect processing unit 94 in FIG. 10. In the alternate registering process, when the defective sector is detected in step S1 due to the execution of the write command from the upper apparatus after the medium formatting process in FIG. 12 was finished, in step S2, the secondary defect list 66 in FIG. 11C is referred, the head space sector in the spare area 70 is retrieved from the last registered alternate address, and data is written by using the head space sector as an alternate sector. In step S3, the defective address in the data area 68 and the alternate address in the spare area 70 in which the alternating process has been performed are registered into the secondary defect list 66.

Figure 14A:
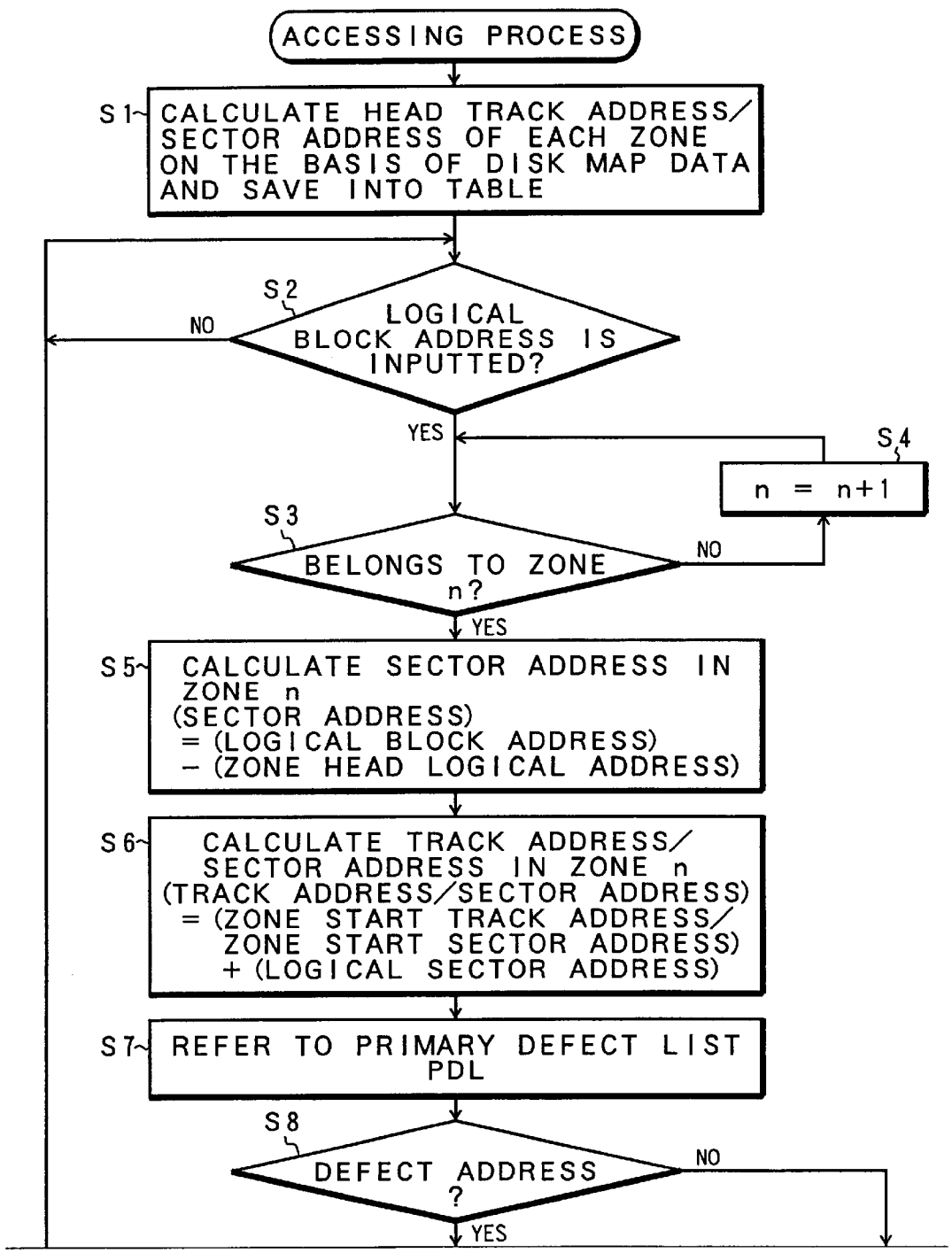
FIGS. 14A and 14B are flowcharts for a slipping process and an alternating process at the time of accessing by the defect processing unit in FIG. 10.
Figure 14B:
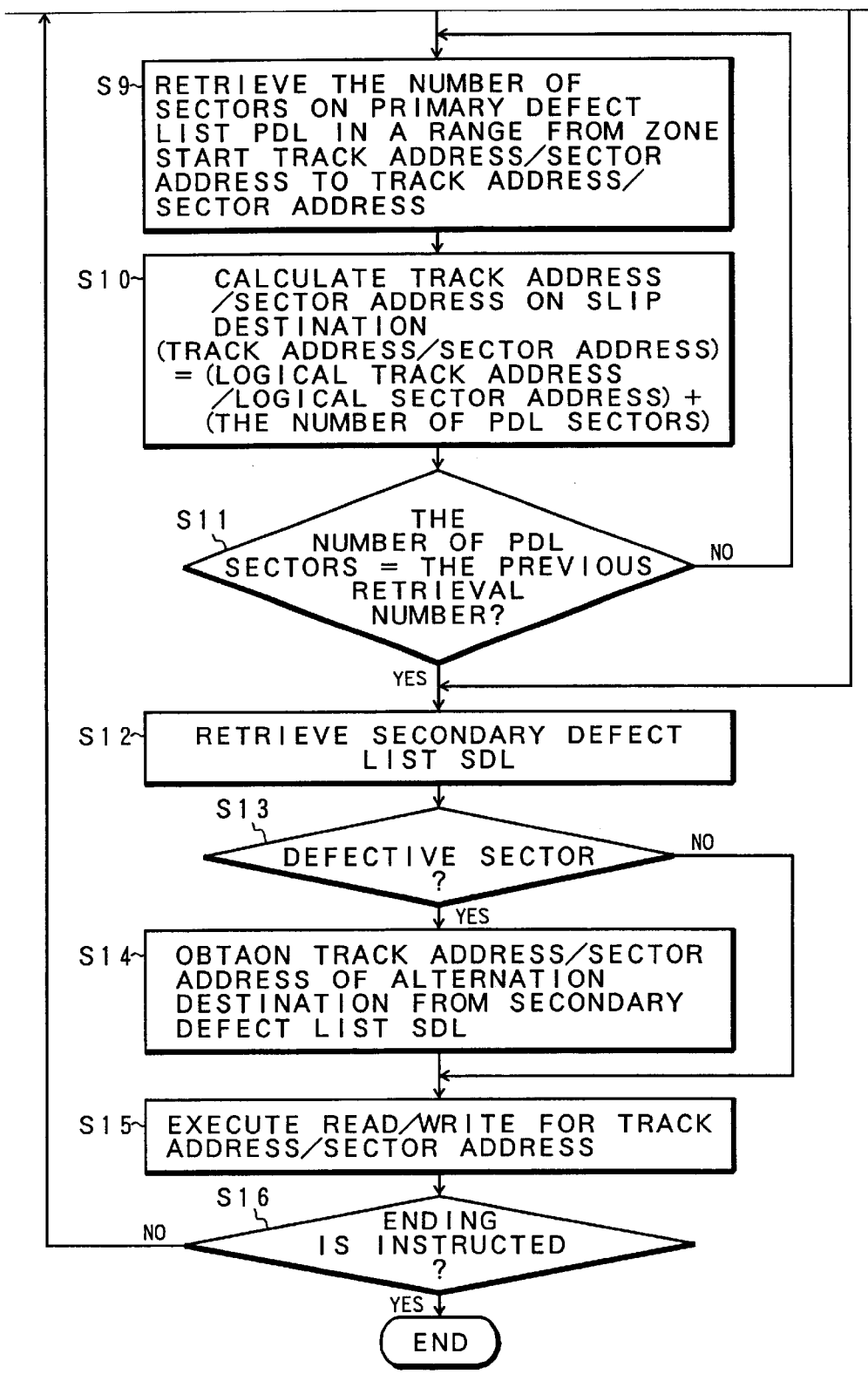

FIGS. 14A and 14B are flowcharts for the accessing process including the read access or write access for the defective sector after completion of the registration to the primary defect list 64 in FIG. 11B or the secondary defect list 66 in FIG. 11C. First in step S1, on the basis of the disk map data 72 shown in FIG. 7, a head track address/sector address showing the head position of each zone is calculated and saved onto the table in the RAM. Subsequently in step S2, the apparatus waits for the input of a logical block address by the read command or write command from the upper apparatus. When the logical block address is inputted, step S3 follows and whether it belongs to the zone of zone No. n=0 or not is first discriminated. Specifically speaking, since the logical block address corresponding to each zone has been predetermined, by comparing the zone head logical block address with the input logical block address, whether the input logical block address belongs to the zone n or not can be recognized. When it does not belong to the zone n=0, the zone No. n is increased by "1" in step S4. A check is made to see if the logical block address belongs to the next zone No. n2. In a manner similar to the above, the processes in steps S3 and S4 are repeated until the zone No. n to which the logical block address belongs is recognized. When the zone No. n to which the input logical block address belongs is recognized, the sector address of the recognized zone n is calculated in step S4. The sector address of the zone n is calculated by (logical sector address)=(logical block address)−(zone head logical address)

Subsequently, the processing routine advances to step S6 and the logical track address/sector address in the zone n is calculated by the following expression from the sector address of the zone n obtained in step S5.

(track address/sector address)=(zone start track address/sector address)+(logical sector address)

When the logical track address/sector address of the zone n can be calculated as mentioned above, in step S7, the primary defect list 64 is referred by the calculated logical track address/sector address. A check is made in step S8 to see if it is the defect address. When it is determined that the logical track address/sector address corresponding to the input logical block address is the defect address with reference to the primary defect list 64, the number of registered sectors on the primary defect list 64 in a range from the zone start track address/sector address to the inputted logical track address/sector address is retrieved in step S9. This process is equivalent to a process for obtaining the number of sectors which are necessary to slip of the defect address corresponding to the inputted logical track address/sector address.

Subsequently, in step S10, the logical track address/sector address of the slip destination is calculated by the following expression.

(track address/sector address)=(logical track address/sector address)+(the number of PDL sectors)

In step S11, a check is made to see if the number of PDL sectors on the primary defect list 64 obtained in step S9 is the same as the retrieval number in the same previous logical track address/sector address. If YES, since the track address/sector address of the slip destination is correct, the processing routine advances to processes in step S12 and subsequent steps. If they do not coincide, since there is an error in the retrieval on the primary defect list 64 in step S9, the processes from step S9 are again repeated. When the processing routine advances to step S12 from step S11, the secondary defect list 66 is subsequently retrieved by the logical track address/sector address calculated in step S6. If the inputted logical track address/sector address exists in the secondary defect list 66, it is recognized that the sector is the defective sector in step S13. In step S14, the logical track address/sector address of the alternation destination is obtained from the secondary defect list 66. Subsequently, in step S15, the reading or writing operation is executed to the decided input track address/sector address. In case of the normal sector which is not registered yet in each of the primary defect list 64 and secondary defect list 66, the track address/sector address to execute the reading or writing operation becomes the track address/sector address calculated in step S6. When the defective sector is recognized with reference to the secondary defect list 64, the track address/sector address of the slip destination calculated in step S10 is used. Further, when the defective sector is recognized by the retrieval of the secondary defect list 66, the track address/sector address of the alternation destination obtained in step S14 is used. When the reading or writing operation for the track address/sector address is executed in step S15, the presence or absence of an end instruction is discriminated in step S16. If there is no end instruction, the processing routine is again returned to step S2 and the apparatus waits for the input of the logical block address by the next read command or write command from the upper apparatus. When there is the end instruction in association with the log-off of the power source or the ejection of the medium in step S16, a series of processes is finished. When the end instruction is received, the primary defect list 64 and secondary defect list 66 developed in the RAM 98 in FIG. 10 are written back and preserved in the optical disk 36. After that, the power supply is turned off or the optical disk cartridge 10 is ejected. There is no need to write back the disk map data 72 included in the disk definition structure 62 since there is no change in contents.

Figure 15:
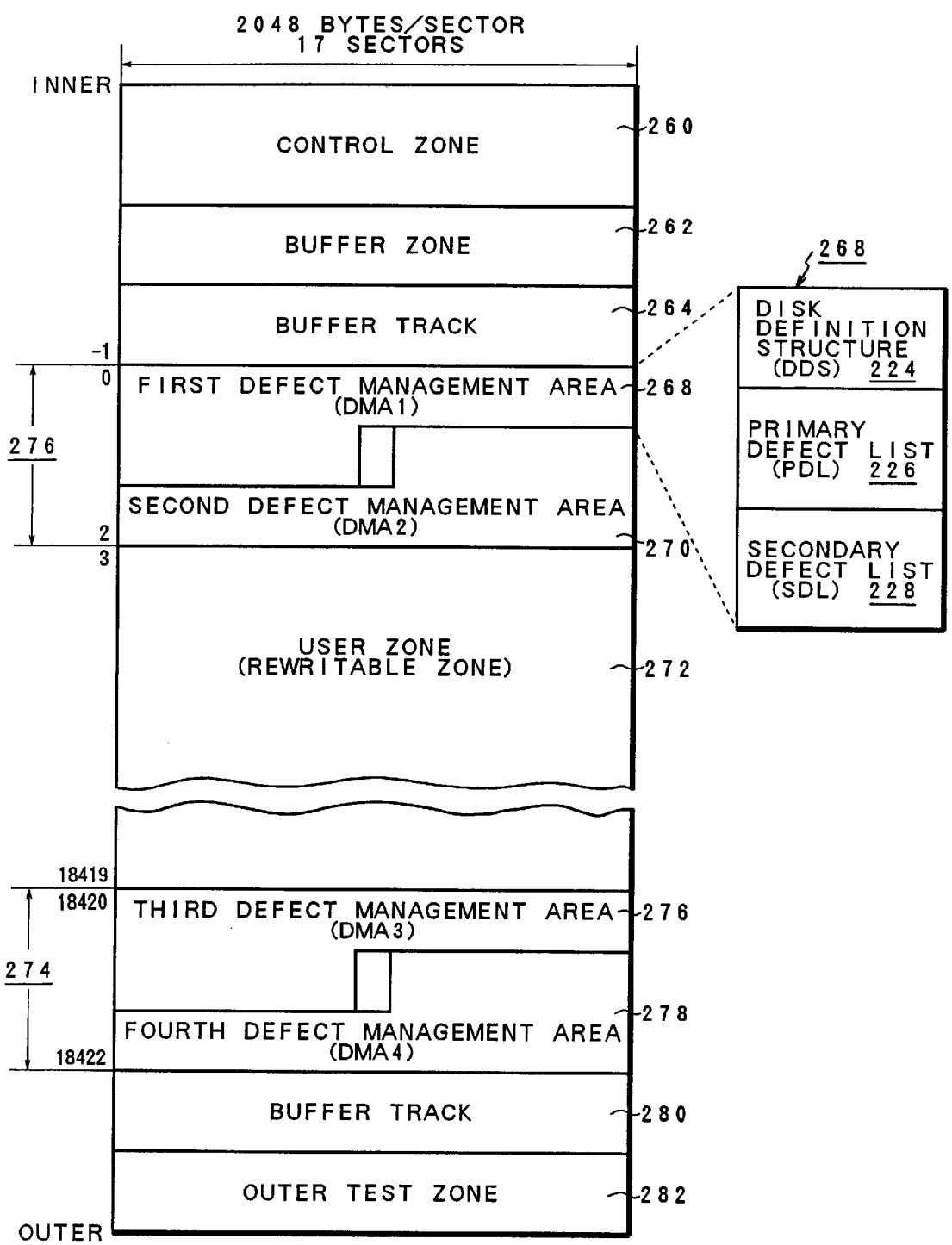
FIG. 15 is an explanatory diagram of a layout of an optical disk of 640 MB built in the cartridge in FIGS. 1A and 1B.
Figure 16:
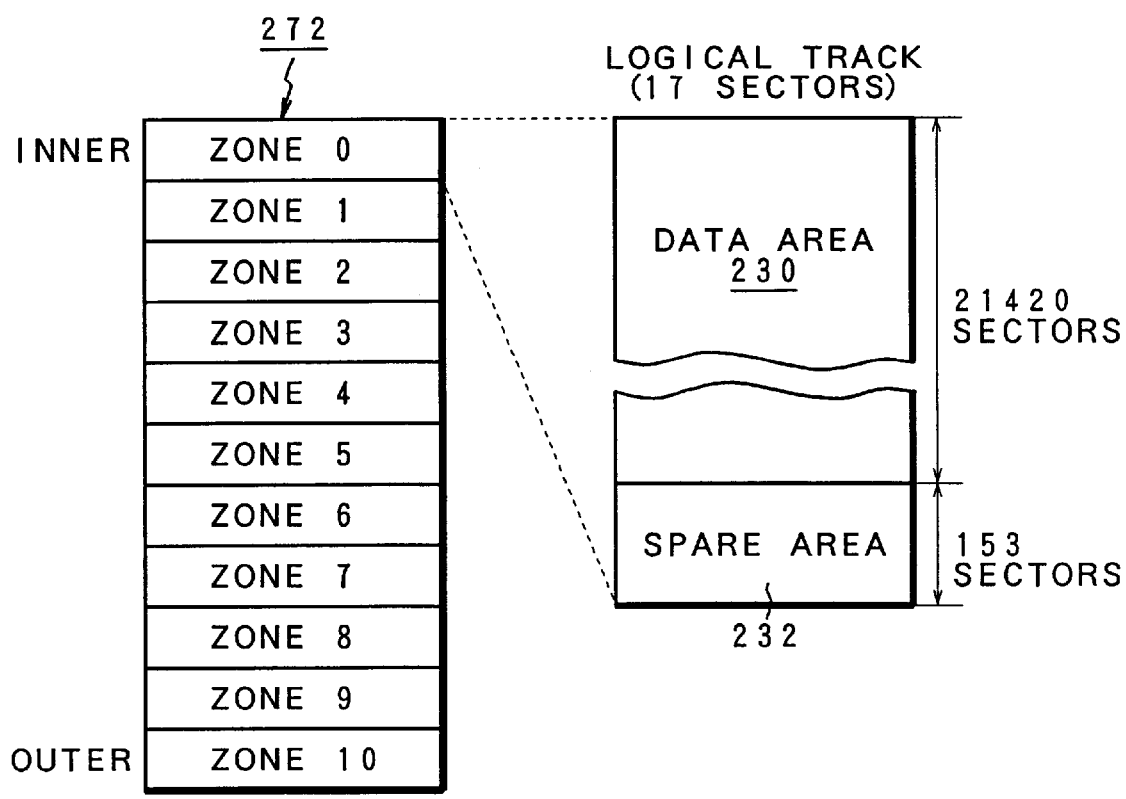
FIG. 16 is an explanatory diagram of a zone division of a user area in FIG. 15 and a spare area in the zone.

FIG. 15 is an explanatory diagram in the case where a disk layout for the optical disk cartridge of 640 MB is used as a target of an optical recording medium according to the invention. In the optical disk of 640 MB, a control zone 260, a buffer zone 262, a buffer track 264, a defect management area 266, a user zone 272, a defect management area 274, a buffer track 220, and an outer test zone 222 are arranged from the inner side. The defect management area 266 on the inner side is constructed by a first defect management area (DMA1) 268 and a second defect management area (DMA2) 270. The defect management area 274 on the outer side is constructed by a third defect management area (DMA3) 276 and a fourth defect management area (DMA4) 278. The first defect management area 268, second defect management area 270, third defect management area 276, and fourth defect management area 278 have the same contents. For example, as extracted and shown on the right side with respect to the first defect management area 268, the area 268 is constructed by a disk definition structure 224, a primary defect list 226, and a secondary defect list 228. The user zone 272 is a rewritable zone which can be accessed by the SCSI interface with the upper apparatus and is divided into 11 zones from the inner side to the outer side as shown in FIG. 16. Zone Nos. 0 to 10 are allocated to the 11 zones. As shown on the right side with respect to zone No. 0, each zone is constructed by a data area 230 and a spare area 232. In the optical disk of 640 MB, the zone Nos. 0 to 10 are allocated from the inner side to the outer side and this order is opposite to the order in the case where the zone Nos. 01 to 17 are allocated from the outer side to the inner side of the optical disk of 1.3 GB in FIG. 6. That is, although the logical track numbers in the disk layout of the optical disk of 1.3 GB in FIG. 6 are increased toward the inner side while setting the outer side to the minus side, the optical disk of 640 MB in FIG. 16 has a reverse layout in which the logical track numbers are increased toward the outer side while setting the inner side to the minus side.

Figure 17:
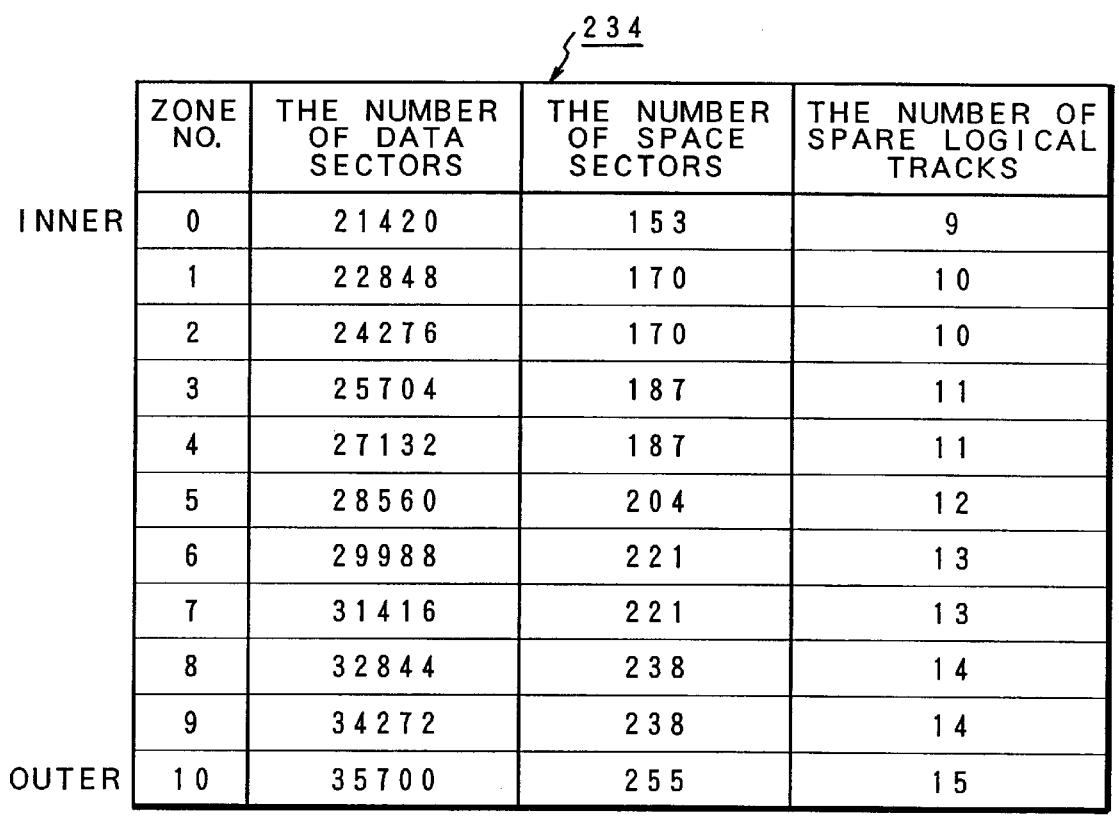
FIG. 17 is an explanatory diagram of disk map data defining the number of data sectors of each zone, the number of spare sectors, and the number of spare logical tracks with respect to the optical disk of 640 MB having a layout in FIG. 15.

FIG. 17 shows a disk map data 234 of the optical disk of 640 MB which is arranged in the disk definition structure 224 in FIG. 15. In the disk map data 234, the numbers of data sectors shown in the diagram are arranged with respect to 11 zones of zone Nos. 0 to 10, the number of data sectors becomes the minimum at zone No. 0 on the innermost side and becomes the maximum at zone No. 10 on the outer side. With respect to each of the zone Nos. 0 to 10, the number of spare sectors allocated as a spare area and the number of spare logical tracks are allocated in a manner such that they become the minimum at zone No. 0 on the innermost side where the number of data sectors becomes the minimum and they become the maximum at zone No. 10 on the outer side where the number of data sectors becomes the maximum, respectively. The number of spare sectors and the number of logical tracks in the disk map data 234 in FIG. 17 are allocated on the basis of FIG. 18. The number of spare sectors for the number of data sectors allocated to the zone Nos. 0 to 10 in FIG. 18 is calculated by using the spare ratio K of the total number of spare sectors D2=2244 sectors× 2048 bytes
=4.596 MB for the total capacity D1=641.55 MB of data of the medium of 640 MB $$K = D2/D1$$
$$= 4.596 \text{ MB}/641.55 \text{ MB}$$
$$= \text{about } 0.0072$$

That is, by multiplying the number of data sectors of each of the zone Nos. 0 to 10 by the spare ratio K=0.0072, the number of spare sectors shown in the diagram can be obtained. The calculated number of spare sectors is rounded to an integer by a method of rounding off the fractions to the nearest whole number. By dividing the number of spare sectors by the number 17 of sectors of one logical track, the number of logical tracks is calculated as shown in the diagram. The number of logical tracks is obtained by rounding off the fractions to one decimal place.

As for the number of spare sectors and the number of logical tracks of each zone calculated in FIG. 18, the ratio for the number of data sectors of each zone is equal to K=0.0072 and is almost the same. In the invention, since the spare area is managed on a logical track unit basis, by rounding off the fractions below the decimal point of the number of logical tracks in FIG. 18 to the nearest whole number, the number of spare logical tracks in FIG. 17 is determined. By multiplying the number of spare logical tracks decided as mentioned above by the number 17 of sectors per logical track, the number of spare sectors of each zone in FIG. 17 can be determined. It will be obviously understood that the total of the numbers of spare sectors of the respective zones allocated in FIG. 18 is equal to the number (2244) of spare sectors which has previously been allocated to the optical disk of 640 MB. This point is also the same with respect to the number of spare logical tracks, namely, it is equal to 132 logical tracks obtained by dividing the total number 2244 of spare sectors by the number 17 of sectors per logical track.

As mentioned above, according to the invention, the spare area which is used for alternation of the defective sector is allocated every zone obtained by dividing the recording surface in the radial direction and the total capacity of spare area is distributed in a manner such that the ratio of the capacity of spare area occupied in the data area capacity of each zone is almost the same as the spare ratio K of the total capacity of spare area for the total capacity of the data area of the medium. Thus, the capacity of the spare area of each zone is equal to the proper capacity corresponding to the data area. Even on the outer side of a large data capacity, the inconvenience such that the spare area is fully exhausted by the alternation due to the defect or the like on the medium and the spare area of another zone is substituted for such a consumed spare area can be solved.

Therefore, even if the data capacity increases, the alternating process of the defective sector which effectively uses the total capacity of spare area per medium with a limitation can be realized and the deterioration of the accessing performance by the alternating process of the defective sector can be prevented.

Although the above embodiment has been described with respect to the optical disk of 1.3 GB and the optical disk of 640 MB as examples, the invention is not limited to them but can be also applied as it is to an optical disk having any other disk capacity.

Although the above embodiment has been described with respect to the case where the magneto-optical recording of the double mask RAD-MSR is used as an example of the optical disk of 1.3 GB, the invention can be also applied to an optical disk of another recording system such as FAD-MSR magneto-optical recording or phase conversion recording.

Although the above embodiment has been described on the assumption of the allocation of the spare sectors in which the maximum value is limited by the SCSI interface as a prerequisite, the total number of spare sectors which can be allocated per optical disk can be also properly determined as necessary.

In the above embodiment, further, although the spare ratio K is set to be constant for each zone, a weight can be also added so as to increase the spare ratio as the position approaches the outer rim zone. For example, a weight of the innermost rim zone is set to 0.9, a weight of the outermost rim zone is set to 1.1, and a weight is linearly allocated to each zone between the innermost and outermost zones. By correcting the spare ratio by multiplying the weight to the spare coefficient K and by using the corrected spare coefficient K which differs every zone, the spare area is increased as the position approaches the outer rim zone. This process is made by considering that the MSR medium has the characteristics such that the margin decreases as the position approaches the outer rim and the optimum allocation of the spare area can be accomplished.

Further, although the above embodiment has been described with respect to an example in the case where the recording surface of the optical disk is divided into a plurality of zones in the radial direction and the spare area which is used for alternation of the defective sector is allocated every zone, the invention is not limited to the zone division but can be also similarly applied to the case where a plurality of zones as targets are divided into one or a plurality of groups and the spare area is set every group.

In addition, the invention is not limited to the numerical values shown in the above embodiment and many variations and modifications of the invention are further possible within the purview of the object and advantages of the invention.

What is claimed is:

1. A recording medium in which data is recorded on a recording surface, comprising:

a plurality of zones obtained by dividing said recording surface into a plurality of portions in the radial direction, having individually different capacities, and each zone having at least one data area; and a plurality of spare areas which are provided for said respective zones and are used as an alternative for a defective sector, each spare area being alternately placed with respect to the data area;

wherein the number of spare logical tracks or the number of spare logical sectors occupied by the spare area in each zone is determined on the basis of a spare ratio K and the data area capacity of each zone;

further wherein said spare ratio K equals a total capacity of the spare areas divided by a total capacity of data areas on said recording surface.

2. A medium according to claim 1, wherein the number of spare logical tracks or the number of spare logical sectors occupied by the spare area in each of said zones is equal to an integer value determined on the basis of a value obtained by multiplying the number of logical tracks or the number of sectors of the data area in each zone by said spare ratio K.

3. A medium according to claim 2, wherein said spare ratio K is weighted so as to be large on the outer side of the recording medium.

4. A medium according to claim 1, wherein when the number of user data zones on said recording surface is equal to 18 and the total number of spare logical tracks in said user data zone is equal to 132, the numbers of spare logical tracks in the zones directing from the outer side of said user zone toward the inner side are sequentially equal to 9, 9, 9, 8, 8, 8, 8, 7, 7, 7, 7, 7, 6, 6, 6, 6, 5 and 5.

5. A medium according to claim 1, wherein when the number of user data zones on said recording surface is equal to 11 and the total number of spare logical tracks in said user data zone is equal to 132, the numbers of spare logical tracks of the zones directing from the outer side of said user zone toward the inner side are sequentially equal to 15, 14, 14, 13, 13, 12, 11, 11, 10, 10, and 9.

6. A medium according to any one of claims 1 to 4, wherein there is provided a recording and reproducing structure of magnetically induced super resolution (MSR) in which at least a recording layer for recording data at a recording density smaller than a beam diameter of a laser beam and a reproducing layer for reproducing the data recorded in said recording layer by a combination of a reproducing magnetic field and a reproducing laser power are formed on a substrate.

7. A recording medium in which data is recorded onto a recording surface, comprising:

a plurality of zones obtained by dividing said recording surface into a plurality of regions at a pitch interval in the radial direction, the zones having individually different capacities, and each zone having at least one data area; and a plurality of spare areas which are provided for said respective zones and are used as an alternative for a defective sector, each spare area being alternately placed with respect to the data area, wherein the pitch interval of the spare areas of each zone is determined on the basis of a spare ratio K and the pitch interval of each zone;

further wherein said spare ratio K equals a total capacity of the spare areas divided by a total capacity of data areas on said recording surface.

8. A medium according to claim 7, wherein said spare ratio K is weighted so as to be large on the outer side of the recording medium.

9. A medium according to claim 7, wherein there is provided a recording and reproducing structure of magnetically induced super resolution (MSR) in which at least a recording layer for recording data at a recording density smaller than a beam diameter of a laser beam and a reproducing layer for reproducing the data recorded in said recording layer by a combination of a reproducing magnetic field and a reproducing laser power are formed on a substrate.

10. A storing apparatus comprising:

a recording unit which has a plurality of zones having individually different capacities, the zones being obtained by dividing a recording surface into a plurality of regions in the radial direction, with each zone having at least one data area, and a plurality of spare areas provided for said respective zones and used as an alternative for a defective sector with each spare area being alternately placed with respect to the data area, the recording unit recording data to a recording medium in which a ratio of (the number of spare logical tracks occupied by the spare areas in each zone)/(the number of sectors) is determined on the basis of a spare ratio K and a capacity of the data area of each zone, wherein the spare ratio K equals a total capacity of the spare areas divided by a total capacity of data areas on said recording surface;

a reproducing unit for reproducing the data on said recording medium; and a defect processing unit for, when the defective sector in said recording medium is detected, allowing an alternating process such that an alternate sector is allocated to a spare area in a zone to which said defective sector belongs and said alternate sector is used to be executed.

11. An apparatus according to claim 10, wherein when the defective sector due to a format of said recording medium is detected, said defect processing unit allows a subsequent normal sector to be used and executes a slipping process for slipping a sector overflowed from a data area into the spare are a in the zone, and when the defective sector is detected after said formatting, said defect processing unit executes the alternating process for allocating the alternate sector to the spare area in the zone and allowing the alternate sector to be used.

12. An apparatus according to claim 10, wherein the number of spare logical tracks or the number of spare logical sectors occupied by the spare area in each zone in said recording medium is an integer value determined on the basis of a value obtained by multiplying the number of logical tracks or the number of sectors of a data area in each zone by said spare ratio K.

13. An apparatus according to any one of claims 10 to 12, wherein when the number of user data zones on said recording surface is equal to 18 and the total number of spare logical tracks in said user data zone is equal to 132, the numbers of spare logical tracks of the zones directing from the outer side of the said user zone toward the inner side are sequentially equal to 9, 9, 9, 8, 8, 8, 8, 7, 7, 7, 7, 7, 6, 6, 6, 6, 5, and 5.

14. An apparatus according to any one of claims 10 to 12, wherein when the number of user data zones on said recording surface is equal to 11 and the total number of spare logical tracks in said user data zone is equal to 132, the numbers of spare logical tracks of the zones directing from the outer side of said user zone toward the inner side are sequentially equal to 15, 14, 14, 13, 13, 12, 11, 11, 10, 10, and 9.

15. An apparatus according to claim 10, wherein there is provided a recording and reproducing structure of magnetically induced super resolution (MSR) in which at least a recording layer for recording data at a recording density smaller than a beam diameter of a laser beam and a reproducing layer for reproducing the data recorded in said recording layer by a combination of a reproducing magnetic field and a reproducing laser power are formed on a substrate of said recording medium.

16. An apparatus according to claim 10, wherein said recording unit or reproducing unit executes a recording or reproducing control according to the zone CAV system.

17. A storing apparatus comprising:

a recording unit which has a plurality of zones having individually different capacities, the zones being obtained by dividing a recording surface into a plurality of regions at a pitch interval in the radial direction with each zone having at least one data area, and a plurality of spare areas which are provided for said respective zones and are used as an alternative for a defective sector with each spare area being alternately placed with respect to the data area the recording unit recording data to a recording medium in which the pitch interval of the spare areas of each zone is determined on the basis of a spare ratio K and the pitch interval of the zones, wherein the spare ratio K equals a total capacity of the spare areas divided by a total capacity of data areas on said recording surfaces;

a reproducing unit for reproducing the data on said recording medium; and a defect processing unit for, when the defective sector in said recording medium is detected, allowing an alternating process such that an alternate sector is allocated to a spare area in a zone to which said defective sector belongs and said alternate sector is used to be executed.

18. An apparatus according to claim 17, wherein when a defective sector due to a format of said recording medium is detected, said defect processing unit allows the subsequent normal sectors to be used and executes a slipping process for slipping the final sector into the spare area in the zone, and when the defective sector is detected after said formatting, said defect processing unit allows the alternating process such that the alternate sector is allocated to the spare area in the zone and the alternate sector is used to be executed.

19. An apparatus according to claim 17, wherein there is provided a recording and reproducing structure of magnetically induced super resolution (MSR) in which at least a recording layer for recording data at a recording density smaller than a beam diameter of a laser beam and a reproducing layer for reproducing the data recorded on said recording layer by a combination of a reproducing magnetic field and a reproducing laser power are formed on a substrate of said recording medium.

20. An apparatus according to claim 17, wherein said recording unit or reproducing unit executes a recording or reproducing control by the zone CAV system.

* * * * *

UNITED STATES PATENT AND TRADEMARK OFFICE
CERTIFICATE OF CORRECTION

PATENT NO. : 6,631,106 B1  Page 1 of 1
DATED : October 7, 2003
INVENTOR(S) : Takehiko Numata et al.

It is certified that error appears in the above-identified patent and that said Letters Patent is hereby corrected as shown below:

<u>Column 20,</u>
Line 25, delete "area a" and insert -- area --.

<u>Column 21,</u>
Line 7, delete "area" and insert -- area, --.

Signed and Sealed this

Fifteenth Day of June, 2004

JON W. DUDAS
*Acting Director of the United States Patent and Trademark Office*